(12) United States Patent
Seo et al.

(10) Patent No.: US 9,912,880 B2
(45) Date of Patent: Mar. 6, 2018

(54) METHOD AND APPARATUS FOR ADJUSTING COLOR

(71) Applicant: Samsung Electronics Co., Ltd., Gyeonggi-do (KR)

(72) Inventors: Jangseok Seo, Gyeonggi-do (KR); Taegun Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 50 days.

(21) Appl. No.: 14/883,874

(22) Filed: Oct. 15, 2015

(65) Prior Publication Data

US 2016/0112654 A1 Apr. 21, 2016

(30) Foreign Application Priority Data

Oct. 15, 2014 (KR) .................. 10-2014-0139031

(51) Int. Cl.
| | |
|---|---|
| *H04N 5/222* | (2006.01) |
| *H04N 5/272* | (2006.01) |
| *G01J 3/46* | (2006.01) |
| *G06F 3/0484* | (2013.01) |
| *H04N 5/232* | (2006.01) |
| *G06T 7/90* | (2017.01) |

(52) U.S. Cl.
CPC ............. *H04N 5/272* (2013.01); *G01J 3/463* (2013.01); *G06F 3/04842* (2013.01); *G06T 7/90* (2017.01); *H04N 5/23293* (2013.01)

(58) Field of Classification Search
CPC .......... G06F 17/3025; G06F 17/30256; G06F 3/04842; G06Q 30/0643; G06T 11/001; G06T 7/90; G09G 2310/0232; G09G 2340/0442; G09G 2340/14; G09G 2360/16; G01J 3/463; H04N 5/23293; H04N 5/272
See application file for complete search history.

(56) References Cited

U.S. PATENT DOCUMENTS

| | | | |
|---|---|---|---|
| 8,502,480 B1 | 8/2013 | Gerszberg et al. | |
| 9,779,323 B2 * | 10/2017 | Hansson | G06K 9/4652 |
| 2004/0257598 A1 * | 12/2004 | Fujio | H04N 1/6011 |
| | | | 358/1.9 |

(Continued)

FOREIGN PATENT DOCUMENTS

| | | |
|---|---|---|
| CN | 102568010 | 7/2012 |
| KR | 1020140054959 | 5/2014 |

OTHER PUBLICATIONS

Mimio: "Pick Your Colors with the Color Picker Tool", XP054976393, Retrieved from the Internet, Nov. 8, 2011, 2 pages.

(Continued)

*Primary Examiner* — Trung Diep
(74) *Attorney, Agent, or Firm* — The Farrell Law Firm, P.C.

(57) ABSTRACT

Methods and apparatuses of operating an electronic device are provided. A display unit of the electronic device displays an image as a preview. A control unit of the electronic device differentiates a reference object and a target object in the image. The control unit determines a reference color of the reference object and a background color of the target object. The control unit adjusts the background color of the target object so as to correspond to the reference color of the reference object. The control unit sets the background color of the target object.

20 Claims, 16 Drawing Sheets

(56) References Cited

U.S. PATENT DOCUMENTS

| | | | |
|---|---|---|---|
| 2005/0093709 A1* | 5/2005 | Franco, Jr. | A61B 5/1112 340/686.1 |
| 2013/0235069 A1* | 9/2013 | Ubillos | G09G 5/026 345/594 |
| 2014/0118600 A1 | 5/2014 | Son et al. | |
| 2014/0132595 A1 | 5/2014 | Boulanger et al. | |
| 2014/0337723 A1* | 11/2014 | Van Tol | G06T 11/001 715/275 |
| 2015/0304554 A1* | 10/2015 | Matsubara | H04N 5/23293 348/239 |

OTHER PUBLICATIONS

European Search Report dated Mar. 22, 2016 issued in countepart application No. 15189790.7-1972, 8 pages.

\* cited by examiner

METHOD AND APPARATUS FOR ADJUSTING COLOR

PRIORITY

This application claims priority under 35 U.S.C. § 119(a) to Korean Patent Application No. 10-2014-0139031, filed on Oct. 15, 2014, the content of which is incorporated herein by reference.

BACKGROUND OF THE INVENTION

1. Field of the Invention

The present invention relates generally to a method and an apparatus for adjusting a color by an electronic device, and more particularly, to a method and an apparatus for simply and conveniently setting and changing a background color of a wearable device by photographing and processing an image by an electronic device.

2. Description of the Related Art

An electronic device generally supports various functions, such as, for example, web page browsing, content reproduction, Social Networking Service (SNS) activity, image photographing, video photographing, and a call function.

Further, a daily object has been used as an information communication terminal beyond a Personal Computer (PC) or a smart phone. Particularly, a wearable device is an information terminal worn on the body. The wearable device has been developed so that it is usable by a general consumer on a daily basis. The wearable device may be an electronic device that can communicate with a user, and is not an electronic device that is simply worn on the body like an accessory. The wearable device does not need to be held or carried by a hand (for example, like a smart phone and a tablet PC), and has improved portability, so that people may wear the wearable device on their clothes or bodies.

The wearable device may continuously collect detailed information about a surrounding environment or changes in body information in real time without disconnection. Recently, the wearable device has been interconnected with a mobile device to provide a new user experience through a voice recognition function, a gesture function, a healthcare function, or the like.

The wearable device has also been recognized as a fashion item. The design, color, User Interface (UI), and the like of the wearable device have become significant factors. Further, there has been an attempt to blend fashion with Information Technology (IT).

SUMMARY OF THE INVENTION

The present invention has been made to address at least the above problems and/or disadvantages and to provide at least the advantages described below. Accordingly, an aspect of the present invention provides an electronic device capable of setting a background color of a wearable device in accordance with a surrounding color corresponding to a location, on which a wearable device is worn, and an operating method thereof.

Another aspect of the present invention provides an electronic device capable of sequentially adjusting a background color of a wearable device so as to be identical to a color of clothes or a body of a user, and an operating method thereof.

Another aspect of the present invention provides an electronic device capable of improving convenience for a user and the usability of the electronic device by implementing an optimal environment for supporting the setting of a background color of a wearable device, and an operating method thereof.

In accordance with an aspect of the present invention, a method of operating an electronic device is provided. A display unit of the electronic device displays an image as a preview. A control unit of the electronic device differentiates a reference object and a target object in the image. The control unit determines a reference color of the reference object and a background color of the target object. The control unit adjusts the background color of the target object so as to correspond to the reference color of the reference object. The control unit sets the background color of the target object.

In accordance with another aspect of the present invention, an electronic device is provided that includes a communication unit configured to perform communication with a wearable device using a predetermined manner of communication. The electronic device also includes a camera module configured to photograph a reference object and a target object. The electronic device further includes a display unit configured to display an image input through the camera module. The electronic device also includes a control unit configured to control the display unit to display the image as a preview, differentiate the reference object and the target object in the image, and set a background color of the target object to correspond to a reference color of the reference object.

In accordance with another aspect of the present invention, a non-transitory computer readable recording medium is provided with computer executable instructions stored thereon executed by a processor to perform a method of operating an electronic device. The method includes displaying an image as a preview, and differentiating a reference object and a target object in the image. The method also includes determining a reference color of the reference object and a background color of the target object. The method further includes adjusting the background color of the target object so as to correspond to the reference color of the reference object, and setting the background color of the target object.

BRIEF DESCRIPTION OF THE DRAWINGS

The above and other aspects, features, and advantages of the present invention will be more apparent from the following detailed description when taken in conjunction with the accompanying drawings, in which.

Figure 1:
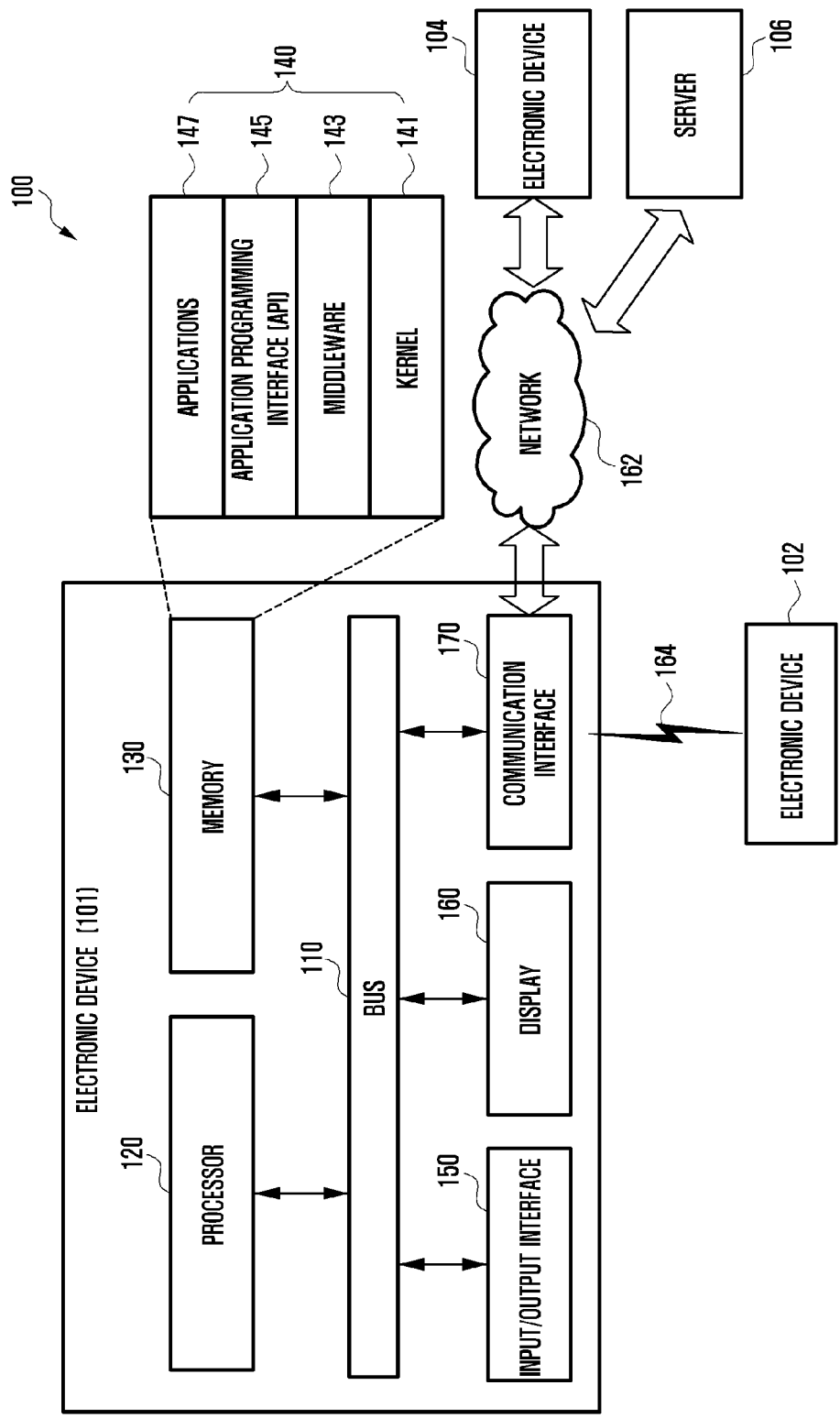
FIG. 1 is a diagram illustrating a network environment including an electronic device, according to an embodiment of the present invention.

DETAILED DESCRIPTION OF EMBODIMENTS
OF THE PRESENT INVENTION

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

As used herein, the expressions "have", "may have", "include", and "may include" refer to the existence of a corresponding feature (e.g., numeral, function, operation, or constituent element, such as component), and do not exclude one or more additional features.

The expressions "A or B", "at least one of A and B", and "one or more of A and B", as used herein, may include all possible combinations of the items listed. For example, the expressions "A or B", "at least one of A and B", and "at least one of A and B" refers to all of (1) including at least one A, (2) including at least one B, or (3) including all of at least one A and at least one B.

The expressions "a first", "a second", "the first", and "the second", as used herein, may modify various components regardless of the order and/or the importance, but does not limit the corresponding components. For example, a first user device and a second user device indicate different user devices although both are user devices. Additionally, a first element may be referred to as a second element, and similarly, a second element may be referred to as a first element without departing from the scope of the present invention.

It should be understood that when an element (e.g., a first element) is referred to as being (operatively or communicatively) "connected" or "coupled" to another element (e.g., a second element), it may be directly connected or coupled to the other element, or any other element (e.g., a third element) may be interposed between them. In contrast, when an element (e.g., the first element) is referred to as being "directly connected" or "directly coupled" to another element (e.g., the second element), there are no elements (e.g., the third element) interposed between them.

The expression "configured to", as used herein, may be exchanged with, for example, "suitable for", "having the capacity to", "designed to", "adapted to", "made to", or "capable of", according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., an embedded processor) only for performing the corresponding operations, or a generic-purpose processor (e.g., a Central Processing Unit (CPU) or an Application Processor (AP)) that can perform the corresponding operations by executing one or more software programs stored in a memory device.

The terms used herein are only used to describe specific embodiments, and are not intended to limit the embodiments the present invention. As used herein, singular forms may include plural forms as well, unless the context clearly indicates otherwise. Unless defined otherwise, all terms used herein, including technical and scientific terms, have the same meanings as those commonly understood by a person skilled in the art to which the present invention pertains. Such terms as those defined in a generally used dictionary may be interpreted to have the same meanings as the contextual meanings in the relevant field of art, and are not to be interpreted to have ideal or excessively formal meanings unless clearly defined herein. In some cases, even a term defined herein should not be interpreted to exclude embodiments of the present invention.

An electronic device may include a communication function. For example, an electronic device may be embodied as a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a portable medical device, a digital camera, or a wearable device (e.g., a Head-Mounted Device (HMD) such as electronic glasses, electronic clothes, an electronic bracelet, an electronic necklace, an electronic appcessory, an electronic tattoo, a smart mirror, a smart watch, a ring, a bracelet, an anklet, a contact lens, and a bio-implantable type (e.g., an implantable circuit)).

According to embodiments of the present invention, an electronic device may be embodied as a smart home appliance that involves a communication function. For example, an electronic device may be a TV, a Digital Versatile Disc (DVD) player, audio equipment, a refrigerator, an air conditioner, a vacuum cleaner, an oven, a microwave, a washing machine, an air cleaner, a set-top box, a TV box, a game console, an electronic dictionary, an electronic key, a camcorder, or an electronic picture frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Device (VID), an electronic device for a ship (e.g., a navigation device for a ship, and a gyro-compass), avionics, security devices, an automotive head unit, a robot for home or industry, an Automated Teller Machine (ATM) in banks, a Point of Sales (POS) device in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to embodiments of the present invention, an electronic device may be embodied as furniture or part of a building or construction having a communication function, an electronic board, an electronic signature receiving device, a projector, or various measuring instruments (e.g., a water meter, an electric meter, a gas meter, a wave meter, etc.). An electronic device may be embodied as one of the above-described devices or any combination thereof.

The electronic device, according to an embodiment of the present invention, may be a flexible device. Further, the electronic device is not limited to the aforementioned devices, and may include a new electronic device according to the development of future technology.

As used herein, the term "user" may indicate a person who uses an electronic device or a device (e.g., an artificial intelligence electronic device) that uses an electronic device.

FIG. 1 is a block diagram illustrating a network environment including an electronic device, according to an embodiment of the present invention. Referring to FIG. 1, an electronic device 101 in a network environment 100 includes, but is not limited to, a bus 110, a processor 120, a memory 130, an input/output interface 150, a display 160, and a communication interface 170.

In some embodiments of the present invention, at least one of the elements of the electronic device 101 may be omitted or other elements may be included in the electronic device 101.

The bus 110 may include, for example, a circuit that interconnects and enables communication (e.g., a control message and/or data) between the processor 120, the memory 130, the in/output interface 150, the display 160, and the communication interface 170.

The processor 120 may include one or more of a CPU, AP, and a Communication Processor (CP). The processor 120, for example, may carry out operations or data processing relating to control and/or communication of at least one other element of the electronic device 101.

The memory 130 may include a volatile memory and/or a non-volatile memory. The memory 130 may store, for example, instructions or data relevant to at least one other element of the electronic device 101. According to an embodiment of the present invention, the memory 130 may store software and/or a program 140. The program 140 includes, for example, a kernel 141, middleware 143, an Application Programming Interface (API) 145, and application programs (or "applications") 147. At least some of the kernel 141, the middleware 143, and the API 145 may be referred to as an Operating System (OS).

The kernel 141 may control or manage system resources (for example, the bus 110, the processor 120, or the memory 130) used for executing an operation or function implemented by other programs (for example, the middleware 143, the API 145, or the applications 147). Furthermore, the kernel 141 may provide an interface through which the middleware 143, the API 145, or the applications 147 may access the individual elements of the electronic device 101 to control or manage the system resources.

The middleware 143 may perform intermediation by which the API 145 or the applications 147 communicate with the kernel 141 to transmit or receive data. In addition, the middleware 143 may process one or more task requests received from the applications 147 according to priorities thereof. For example, the middleware 143 may assign a priority, which enables the use of system resources (e.g., the bus 110, the processor 120, the memory 130, etc.) of the electronic device 101, to at least one of the applications 147. For example, the middleware 143 may perform scheduling or loading balancing on the one or more task requests by processing the one or more task requests according to the priorities assigned thereto.

The API 145, which is an interface for allowing the applications 147 to control a function provided by the kernel 141 or the middleware 143, may include, for example, at least one interface or function (e.g., a command) for file control, window control, image processing, text control, and the like.

The input/output interface 150, for example, may function as an interface that may transfer instructions or data input from a user or another external device to the one or more other elements of the electronic device 101. Furthermore, the input/output interface 150 may output the instructions or data received from the other element(s) of the electronic device 101 to the user or another external device.

The display 160 may include, for example, a Liquid Crystal Display (LCD), a Light Emitting Diode (LED) display, an Organic Light Emitting Diode (OLED) display, a Micro Electro Mechanical System (MEMS) display, or an electronic paper display. For example, the display 160 may display various pieces of content (e.g., text, images, videos, icons, symbols, etc.) to the user. The display 160 may include a touch screen, and for example, may receive a touch, gesture, proximity, or hovering input using an electronic pen or a body part of a user.

The communication interface 170, for example, may enable communication between the electronic device 101 and an external device (e.g., a first external electronic device 102, a second external electronic device 104, or a server 106). For example, the communication interface 170 may be connected to a network 162 through wireless or wired communication for communication with the second external electronic device 104 or the server 106.

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), Wireless Broadband (WiBro), and Global System for Mobile Communications (GSM), as a cellular communication protocol. In addition, the wireless communication may include, for example, short range communication 164. The short-range communication 164 may include at least one of, for example, WiFi, Bluetooth, Near Field Communication (NFC), and GPS. The wired communication may include at least one of, for example, a Universal Serial Bus (USB), a High Definition Multimedia Interface (HDMI), Recommended Standard 232 (RS-232), and a Plain Old Telephone Service (POTS). The network 162 may include at least one of a communication network, such as a computer network (e.g., a Local Area Network (LAN), or a Wide Area Network (WAN)), the Internet, and a telephone network.

Each of the first and second external electronic devices 102 and 104 may be of a type that is identical to or different from that of the electronic device 101. According to an embodiment of the present invention, the server 106 may include a group of one or more servers. According to an embodiment of the present invention, all or some of the operations performed in the electronic device 101 may be performed in another electronic device or a plurality of electronic devices (e.g., the first external electronic device 102, the second external electronic devices 102, or the server 106). According to an embodiment of the present invention, when the electronic device 101 has to perform some functions or services automatically or in response to a request, the electronic device 101 may make a request to perform at least some functions relating thereto to the first external electronic device 102, the second external electronic device 104, or the server 106 instead of performing the functions or services by itself or additionally. The first external electronic device 102, the second external electronic device 104, or the server 106 may carry out the requested functions or the additional functions and transfer the result to the electronic device 101. The electronic device 101 may process the received result as it is or may additionally provide requested functions or services. To achieve this, for example, cloud computing, distributed computing, or client-server computing technology may be used.

Figure 2:
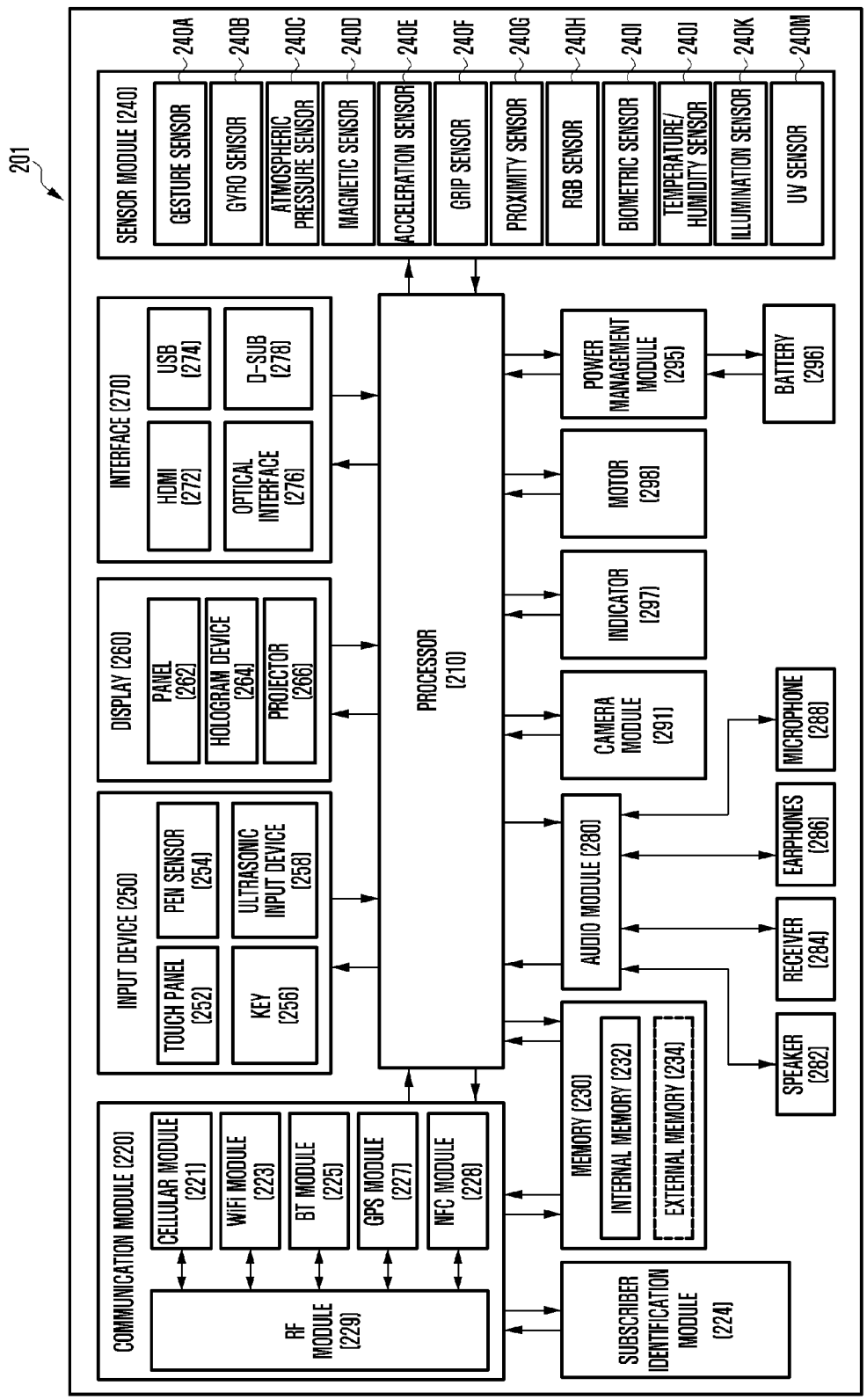
FIG. 2 is a block diagram illustrating an electronic device, according to an embodiment of the present invention.

FIG. 2 is a block diagram illustrating an electronic device, according to an embodiment of the present invention.

An electronic device 201 may include the entirety or a part of the electronic device 101 of FIG. 1. The electronic device 201 may include at least one AP or processor 210, a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by driving an operating system or an application program, and may perform processing of various pieces of data and calculations. The processor 210 may be implemented by, for example, a System on Chip (SoC). According to an embodiment of the present invention, the processor 210 may further include a Graphic Processing Unit (GPU) and/or an image signal processor. The processor 210 may include at least some of the elements (e.g., a cellular module 221) illustrated in FIG. 2. The processor 210 may load, into a volatile memory, instructions or data received from at least one (e.g., a non-volatile memory) of the other elements, and may process the loaded instructions or data, and may store various data in a non-volatile memory.

The communication module 220 may have a configuration that is the same as or similar to that of the communication interface 170 of FIG. 1. The communication module 220 includes, for example, a cellular module 221, a Wi-Fi module 223, a BT module 225, a GPS module 227, an NFC module 228, and a Radio Frequency (RF) module 229.

The cellular module 221 may provide a voice call, a video call, a message service, an internet service, or the like, through a communication network (e.g., LTE, LTE-A, CDMA, WCDMA, UMTS, WiBro, or GSM, etc.). Additionally, the cellular module 221 may perform identification and authentication of the electronic device in the communication network, using the SIM card 224. According to an embodiment of the present invention, the cellular module 221 may perform at least part of functions that the AP 210 can provide. For example, the cellular module 221 may perform at least part of a multimedia control function.

According to an embodiment of the present invention, cellular module 221 may include a Communication Processor (CP). Additionally, the cellular module 221 may be formed as an SoC, for example. Although some elements, such as the cellular module 221 (e.g., the CP), the memory 230, or the power management module 295 are shown as being separate and different from the AP 210 in FIG. 2, the AP 210 may be formed to have at least part (e.g., the cellular module 221) of the above elements in an embodiment o the present invention.

According to an embodiment of the present invention, the AP 210 or the cellular module 221 (e.g., the CP) may load commands or data, received from a nonvolatile memory connected thereto or from at least one of the other elements, into a volatile memory to process them. Additionally, the AP 210 or the cellular module 221 may store data, received from or created at one or more of the other elements, in the nonvolatile memory.

Each of the WiFi module 223, the BT module 225, the GPS module 227, and the NFC module 228 may include a processor for processing data transmitted or received therethrough. Although FIG. 2 shows the cellular module 221, the WiFi module 223, the BT module 225, the GPS module 227, and the NFC module 228 as different blocks, at least part of them may be contained in a single Integrated Circuit (IC) chip or a single IC package. For example, at least part of respective processors corresponding to the cellular module 221, the WiFi module 223, the BT module 225, the GPS module 227, and the NFC module 228 (e.g., the CP corresponding to the cellular module 221 and a WiFi processor corresponding to the WiFi module 223) may be formed as a single SoC.

The RF module 229 may transmit and receive data, e.g., RF signals or any other electric signals. Although not shown, the RF module 229 may include a transceiver, a Power Amp Module (PAM), a frequency filter, a Low Noise Amplifier (LNA), or the like. Also, the RF module 229 may include any component, e.g., a wire or a conductor, for transmission of electromagnetic waves in a free air space. Although FIG. 2 shows that the cellular module 221, the WiFi module 223, the BT module 225, the GPS module 227, and the NFC module 228 share the RF module 229, at least one of them may perform transmission and reception of RF signals through a separate RF module.

The SIM card 224 may be inserted into a slot formed at a certain place of the electronic device. The SIM card 224 may contain therein an Integrated Circuit Card IDentifier (ICCD) or an International Mobile Subscriber Identity (IMSI).

The memory 230 (e.g., the memory 130) includes at least one of an internal memory 232 and an external memory 234. The internal memory 232 may include, for example, at least one of a volatile memory (e.g., Dynamic RAM (DRAM), Static RAM (SRAM), Synchronous DRAM (SDRAM), etc.) or a nonvolatile memory (e.g., One Time Programmable ROM (OTPROM), Programmable ROM (PROM), Erasable and Programmable ROM (EPROM), Electrically Erasable and Programmable ROM (EEPROM), mask ROM, flash ROM, NAND flash memory, NOR flash memory, etc.).

According to an embodiment of the present invention, the internal memory 232 may have the form of a Solid State Drive (SSD). The external memory 234 may include a flash drive, e.g., Compact Flash (CF), Secure Digital (SD), Micro-SD, Mini-SD, eXtreme Digital (xD), memory stick, or the like.

The external memory 234 may be functionally connected to the electronic device 200 through various interfaces. According to an embodiment of the present invention, the electronic device 200 may further include a storage device or medium such as a hard drive.

The sensor module 240 may measure physical quantity or sense an operating status of the electronic device 200, and then convert the measured or sensed information into electric signals. The sensor module 240 includes, for example, at least one of a gesture sensor 240A, a gyro sensor 240B, an atmospheric sensor 240C, a magnetic sensor 240D, an acceleration sensor 240E, a grip sensor 240F, a proximity sensor 240G, a color sensor 240H (e.g., Red, Green, Blue (RGB) sensor), a biometric sensor 240I, a temperature-humidity sensor 240J, an illumination sensor 240K, and an UltraViolet (UV) sensor 240M. Additionally or alternatively, the sensor module 240 may include, e.g., an E-nose sensor, an ElectroMyoGraphy (EMG) sensor, an ElectroEncephaloGram (EEG) sensor, an ElectroCardioGram (ECG) sensor, an InfraRed (IR) sensor, an iris scan sensor, or a finger scan sensor. The sensor module 240 may also include a control circuit for controlling one or more sensors equipped therein.

The input unit 250 includes at least one of a touch panel 252, a digital pen sensor 254, a key 256, and an ultrasonic input unit 258. The touch panel 252 may recognize a touch input and may operate as one of a capacitive type, a resistive type, an infrared type, or an ultrasonic type. The touch panel 252 may also include a control circuit. In case of a capacitive type, physical contact or proximity may be recognized. The touch panel 252 may further include a tactile layer. In this case, the touch panel 252 may offer a tactile feedback to a user.

The digital pen sensor 254 may be formed in the same or a similar manner as receiving a touch input or by using a separate recognition sheet. The key 256 may include, for example, a physical button, an optical key, or a keypad. The ultrasonic input unit 258 is a specific device capable of identifying data by sensing sound waves with a microphone 288 in the electronic device 200 through an input tool that generates ultrasonic signals, thus allowing wireless recognition. According to an embodiment of the present invention, the electronic device 200 may receive user input from any external device (e.g., a computer or a server) connected thereto through the communication module 220.

The display 260 (e.g., the display 160) includes at least one of a panel 262, a hologram 264, and a projector 266. The panel 262 may be, for example, Liquid Crystal Display (LCD), Active Matrix Organic Light Emitting Diode (AM-OLED), or the like. The panel 262 may have a flexible, transparent or wearable form. The panel 262 may be formed as a single module with the touch panel 252. The hologram 264 may show a stereoscopic image in the air using interference of light. The projector 266 may project an image onto a screen, which may be located inside or outside of the electronic device 200. According to an embodiment of the present invention, the display 260 may further include a control circuit for controlling the panel 262, the hologram 264, and the projector 266.

The interface 270 includes at least one of an HDMI 272, a USB 274, an optical interface 276, or a D-subminiature (D-sub) 278. The interface 270 may be contained, for example, in the communication interface 160 shown in FIG. 1. Additionally or alternatively, the interface 270 may include, for example, a Mobile High-definition Link (MHL) interface, an SD card/Multi-Media Card (MMC) interface, or an Infrared Data Association (IrDA) interface.

The audio module 280 may perform a conversion between sounds and electric signals. At least part of the audio module 280 may be contained, for example, in the input/output interface 140 of FIG. 1. The audio module 280 may process sound information inputted or outputted through a speaker 282, a receiver 284, an earphone 286, or the microphone 288.

The camera module 291 is a device capable of obtaining still images and moving images. According to an embodiment of the present invention, the camera module 291 may include at least one image sensor (e.g., a front sensor or a rear sensor), a lens, an Image Signal Processor (ISP), or a flash (e.g., LED or xenon lamp).

The power management module 295 may manage electric power of the electronic device 200. The power management module 295 may include, for example, a Power Management Integrated Circuit (PMIC), a charger IC, or a battery gauge.

The PMIC may be formed, for example, of an IC chip or SoC. Charging may be performed in a wired or wireless manner. The charger IC may charge a battery 296 and prevent overvoltage or overcurrent from a charger. According to an embodiment of the present invention, the charger IC may have a charger IC used for at least one of wired and wireless charging types. A wireless charging type may include, for example, a magnetic resonance type, a magnetic induction type, or an electromagnetic type. Any additional circuit for a wireless charging may be used such as, for example, a coil loop, a resonance circuit, or a rectifier.

The battery gauge may measure the residual amount of the battery 296 and a voltage, current, or temperature in a charging process. The battery 296 may store or create electric power therein and supply electric power to the electronic device 200. The battery 296 may be, for example, a rechargeable battery or a solar battery.

The indicator 297 may show thereon a current status (e.g., a booting status, a message status, or a recharging status) of the electronic device 201 or of a corresponding part thereof (e.g., the AP 210). The motor 298 may convert an electric signal into a mechanical vibration. The electronic device 201 may include a specific processor (e.g., GPU) for supporting a mobile TV. This processor may process media data that complies with standards of Digital Multimedia Broadcasting (DMB), Digital Video Broadcasting (DVB), or media flow.

Each of the above-described elements of the electronic device may be formed of one or more components, and its name may be varied according to the type of electronic device. The electronic device, as described herein, may be formed of at least one of the above-described elements without other elements or with additional elements. Some of the elements may be integrated into a single entity that still performs the same functions as those of such elements before integration.

Figure 3:
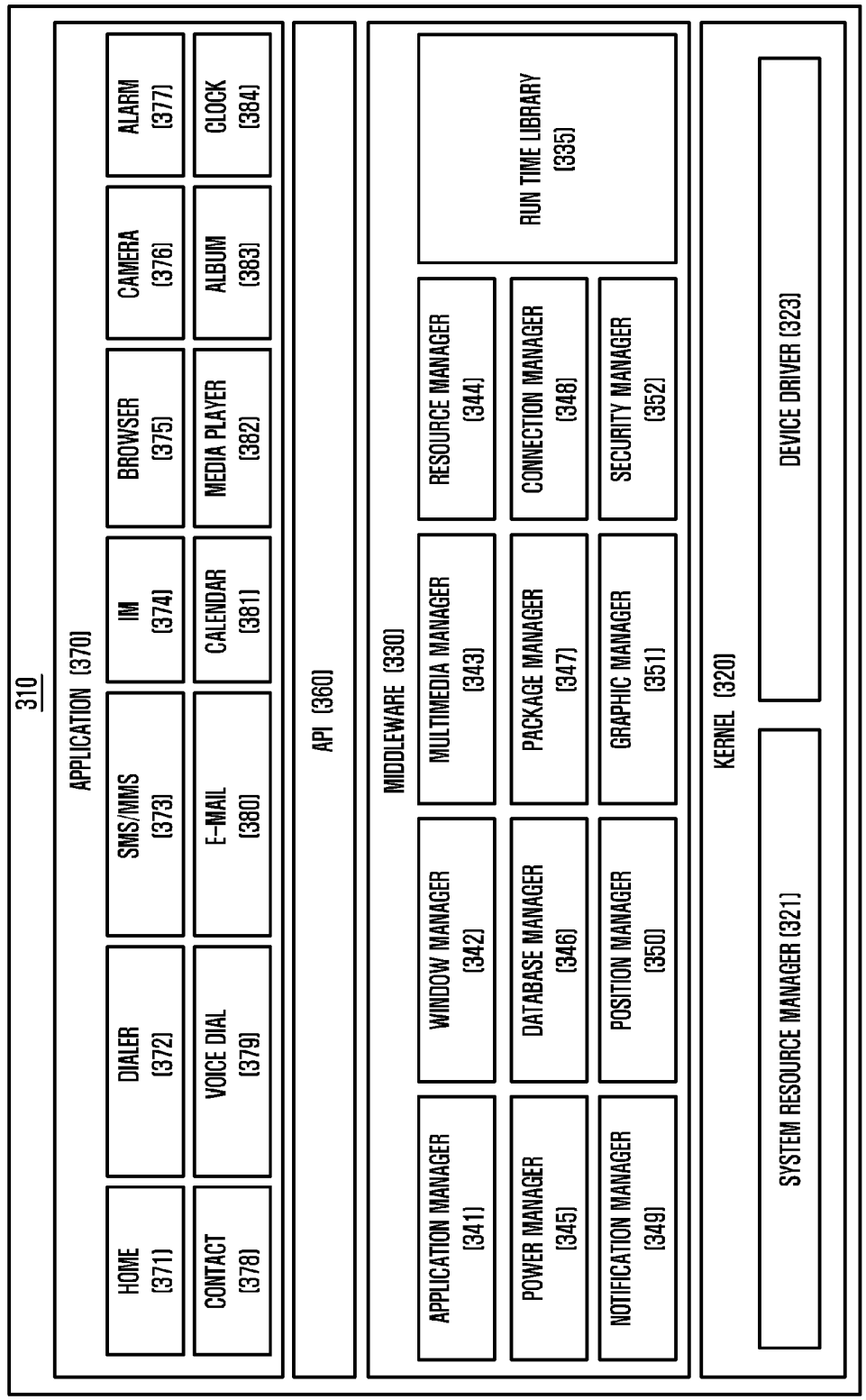
FIG. 3 is a block diagram illustrating a program module, according to an embodiment of the present invention.

FIG. 3 is a block diagram illustrating a program module, according to an embodiment of the present invention.

According to an embodiment of the present invention, a program module 310 (for example, the program 140 of FIG. 1) may include an Operating System (OS) for controlling resources related to an electronic device (for example, the electronic device 101 of FIG. 1) and/or various applications (for example, the applications 147 of FIG. 1) executed in the operating system.

The program module 310 includes a kernel 320, middleware 330, an API 360, and applications 370. At least some of the program module 310 may be preloaded on the electronic device, or may be downloaded from an external electronic device (e.g., the first external electronic device 102, the second external electronic device 104, or the server 106).

The kernel 320 (e.g., the kernel 141) may include, for example, a system resource manager 321 and/or a device driver 323. The system resource manager 321 may perform the control, allocation, retrieval, or the like, of system resources. According to an embodiment of the present invention, the system resource manager 321 may include a process management unit, a memory management unit, or a file system management unit. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

For example, the middleware 330 may provide a function required in common by the applications 370, or may provide various functions to the applications 370 through the API 360 so as to enable the applications 370 to efficiently use the limited system resources within the electronic device. According to an embodiment of the present invention, the middleware 330 (for example, the middleware 143 of FIG. 1) includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a complier uses to add a new function by using a programming language during the execution of the application 370. The runtime library 335 may perform input/output management, memory management, the functionality for an arithmetic function, or the like.

The application manager 341 may manage, for example, the life cycle of at least one of the applications 370. The window manager 342 may manage GUI resources used for the screen. The multimedia manager 343 may determine a format required to reproduce various media files, and may encode or decode a media file by using a coder/decoder (codec) appropriate for the relevant format. The resource manager 344 may manage resources, such as a source code, a memory, a storage space, and the like, of at least one of the applications 370.

The power manager 345 may operate together with a Basic Input/Output System (BIOS) to manage a battery or power and may provide power information required for the operation of the electronic device. The database manager 346 may generate, search for, and/or change a database to be used by at least one of the applications 370. The package manager 347 may manage the installation or update of an application distributed in the form of a package file.

The connectivity manager 348 may manage a wireless connection such as, for example, Wi-Fi or Bluetooth. The notification manager 349 may display or notify of an event, such as an arrival message, an appointment, a proximity notification, and the like, in such a manner as not to disturb the user. The location manager 350 may manage location information of the electronic device. The graphic manager 351 may manage a graphic effect, which is to be provided to the user, or a user interface related to the graphic effect. The security manager 352 may provide various security functions required for system security, user authentication, and the like. According to an embodiment of the present invention, when the electronic device (for example, the electronic device 101) has a telephone call function, the middleware 330 may further include a telephony manager for managing a voice or video call function of the electronic device.

The middleware 330 may include a middleware module that forms a combination of various functions of the above-described elements. The middleware 330 may provide a module specialized for each type of OS in order to provide a differentiated function. The middleware 330 may dynamically delete some of the existing elements, or may add new elements.

The API 360 (e.g., the API 145 of FIG. 1) is, for example, a set of API programming functions, and may be provided with a different configuration according to the OS. For example, one API set may be provided for each platform, or two or more API sets may be provided for each platform.

The applications 370 (for example, the applications 134) include one or more applications capable of performing a function of, for example, a home 371, a dialer 372, SMS/MMS 373, an Instant Message (IM) 374, a browser 375, a camera 376, an alarm 377, a contact 378, a voice dialer 379, an email 380, a calendar 381, a media player 382, an album 383, and a clock 384. Additionally or alternatively, the applications 370 may include one or more applications capable of performing a function of, for example, health care (for example, a measurement of an exercise quantity or blood sugar level) or environment information provision (for example, provision of atmospheric pressure, humidity, or temperature information).

According to an embodiment of the present disclosure, the applications 370 may include an application (hereinafter, information exchange application) supporting information exchange between the electronic device (e.g., the electronic device 101 of FIG. 1) and an external electronic device (e.g., the first external electronic device 102 or the second external electronic device 104). The application associated with information exchange may include, for example, a notification relay application for forwarding specific information to an external electronic device, or a device management application for managing an external electronic device.

For example, the notification relay application may include a function of delivering, to the external electronic device 102 or 104, notification information generated by other applications (e.g., an SMS/MMS application, an email application, a health care application, an environmental information application, etc.) of the electronic device 101. Further, the notification relay application may receive notification information from, for example, an external electronic device and provide the received notification information to a user.

The device management application may manage (for example, install, delete, or update), for example, a function for at least a part of the external electronic device (for example, the second external electronic device 104) communicating with the electronic device (for example, turning on/off the external electronic device itself (or some elements thereof) or adjusting brightness (or resolution) of a display), applications executed in the external electronic device, or services provided from the external electronic device (for example, a telephone call service or a message service).

According to an embodiment of the present invention, the application 370 may include an application (e.g., a health care application of a mobile medical device or the like) designated according to an attribute of the external electronic device 102 or 104. According to an embodiment of the present invention, the applications 370 may include an application received from the external electronic device 102 or 104, or the server 106. According to an embodiment of the present invention, the applications 370 may include a pre-loaded application or a third party application that may be downloaded from a server. The names of the elements of the program module 310, according to the embodiment illustrated in FIG. 28, may vary according to the type of operating system.

According to an embodiment of the present invention, at least a part of the programming module 310 may be implemented in software, firmware, hardware, or a combination of two or more thereof. At least some of the program module 310 may be implemented (e.g., executed) by, for example, the processor 120. At least some of the program module 310 may include, for example, a module, a program, a routine, a set of instructions, and/or a process for performing one or more functions.

The term "module", as used herein, may refer to, for example, a unit including one or more combinations of hardware, software, and firmware. The "module" may be interchangeably used with, for example, the term "unit", "logic", "logical block", "component", or "circuit". A module may be a minimum unit of an integrated component element or a part thereof. A module may be a minimum unit for performing one or more functions or a part thereof. The "module" may be mechanically or electronically implemented. For example, the "module", according to an embodiment of the present invention, may include at least one of an Application-Specific Integrated Circuit (ASIC) chip, a Field-Programmable Gate Array (FPGA), and a programmable-logic device for performing operations that have been known or are to be developed.

According to an embodiment of the present invention, at least some of the devices (for example, modules or functions thereof) or the method (for example, operations) may be implemented by a command stored in a computer-readable storage medium in a programming module form. The instruction, when executed by a processor, may cause the one or more processors to execute the function corresponding to the instruction. The computer-readable recoding media may be, for example, the memory 130.

The computer readable recoding medium may include a hard disk, a floppy disk, magnetic media (for example, a magnetic tape), optical media (for example, a Compact Disc Read Only Memory (CD-ROM) and a DVD), magneto-optical media (for example, a floptical disk), a hardware device (for example, a ROM, a RAM, a flash memory), and the like. In addition, the program instructions may include high class language codes, which can be executed in a computer by using an interpreter, as well as machine codes made by a compiler. The aforementioned hardware device may be configured to operate as one or more software modules in order to perform operations of embodiments of the present invention.

Any of the modules or programming modules, according to various embodiments of the present invention, may include at least one of the above described elements, exclude some of the elements, or further include other additional elements. The operations performed by the modules, programming module, or other elements, according to various embodiments of the present invention, may be executed in a sequential, parallel, repetitive, or heuristic manner. Further, some operations may be executed according to another order or may be omitted, or other operations may be added.

Embodiments of the present invention relate to an electronic device supporting color correction and an operating method thereof. Embodiments of the present invention suggest an electronic device, which is capable of setting and changing a background color of an electronic device or an external electronic device (for example, a wearable device), by photographing and processing an image, and an operating method thereof.

For the convenience of description, an electronic device is differentiated from a wearable device, and an operation of setting a background color of the wearable device by an interconnection between the electronic device and the wearable device is described. However, in various embodiments of the present invention, a wearable device may be included in the scope of an electronic device, and an operation of setting a background color may be performed by various electronic devices, as well as a wearable device. For example, an electronic device, in the various embodiments of the present invention, may include all of the devices using one or more of various processors (for example, the processor 120 of FIG. 1) of an AP, a GPU, and a CPU, such as every information and communication device, multimedia device, wearable device, and an application device supporting functions according to various embodiments of the present invention.

As described in detail below, background color setting may include an operation of changing a color of a background of an electronic device by adjusting, and additionally or alternatively, may include an operation of changing colors of various skins, UIs, and text operated by an electronic device.

An electronic device and a wearable device, in various embodiments of the present invention, may be connected through a set communication interface, and an electronic device may control a wearable device connected through the set communication interface. A connection between an electronic device and a wearable device, in various embodiments of the present invention, may be in the form of a wireless connection between an electronic device and a wearable device by a wireless communication interface using a wireless network technology, such as, for example, a Personal Area Network (PAN), or may be in the form of a wired-connection between the electronic device and the wearable device by a wired communication interface. In various embodiments of the present invention, a personal communication network may represent a network for communication between various electronic devices (for example, a wearable device and other electronic devices) within a communication range of an electronic device based on a short range communication technology. The short range communication technology may use at least one of WiFi, Bluetooth, NFC, IrDA, UWB, ZigBee, and Radio Frequency Identification (RFID).

Hereinafter, an electronic device, according to various embodiments of the present invention, a method of setting a background color of a wearable device by using the electronic device, and a system thereof will be described. However, various embodiments of the present invention are not limited by the contents described below.

Various embodiments of the present invention are described below based on an approach method using hardware. However, various embodiments of the present invention include a technology using both hardware and software, so that various embodiments of the present invention do not exclude an approach method based on software.

Figure 4:
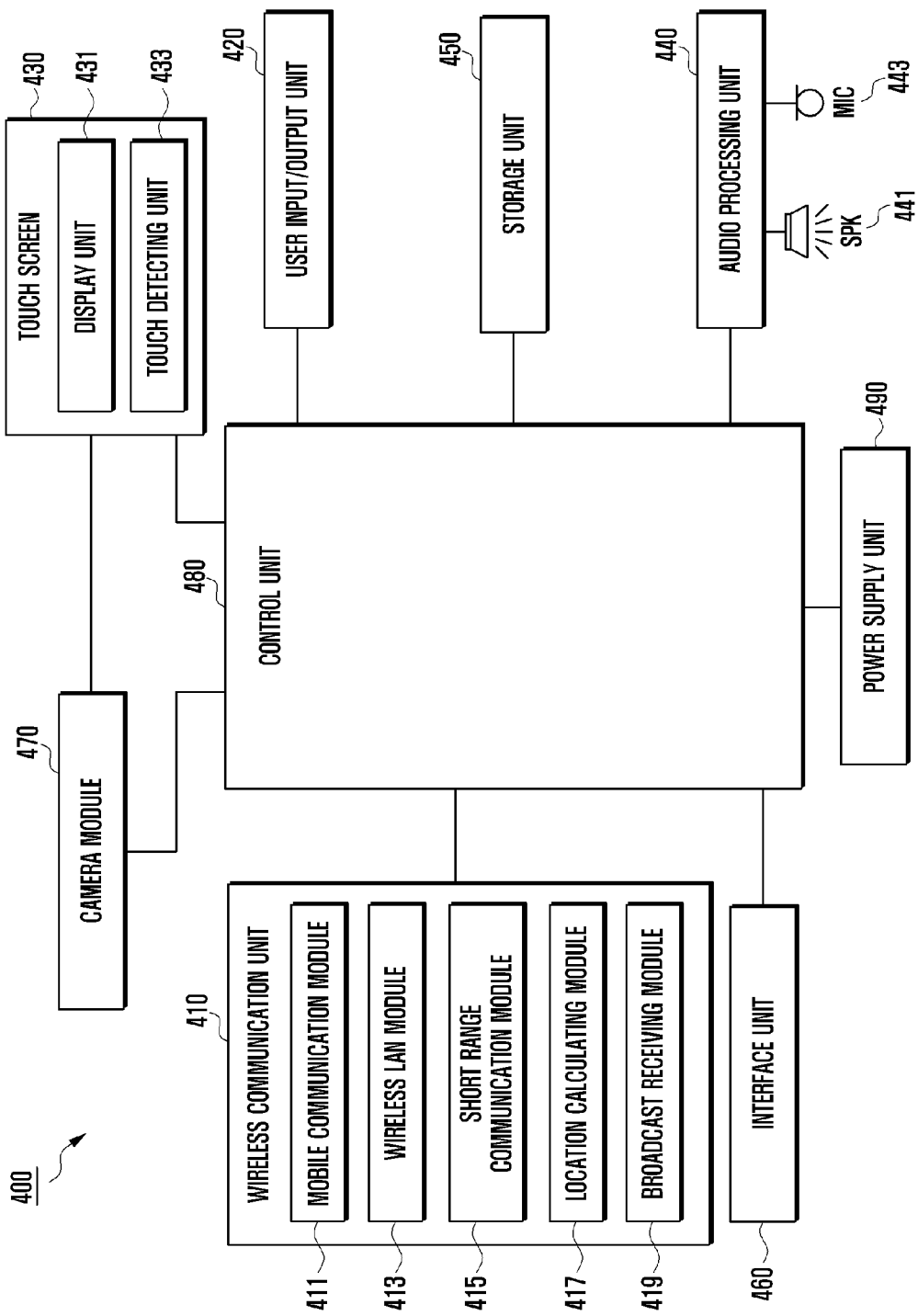
FIG. 4 is a diagram illustrating a configuration of an electronic device, according to an embodiment of the present invention.

FIG. 4 is a diagram illustrating a configuration of an electronic device, according to an embodiment of the present invention.

Referring to FIG. 4, an electronic device 400 includes a wireless communication unit 410, a user input unit 420, a touch screen 430, an audio processing unit 440, a storage unit 450, an interface unit 460, a camera module 470, a control unit 480, and a power supply unit 490. The electronic device 400 may be implemented with more or fewer elements than those illustrated in FIG. 4.

The wireless communication unit 410 may be configured the same as or similar to that of the communication module 220 of FIG. 2. The wireless communication unit 410 may include one or more modules capable of establishing wireless communication between the electronic device 400 and a wireless communication system, or between the electronic device 400 and another electronic device 102 and 104, or the server 106. For example, the wireless communication unit 410 may include a wireless communication module 411, a Wireless Local Area Network (WLAN) module 413, a short range communication module 415, a location calculating module 417, and a broadcast receiving module 419. In various embodiments of the present invention, the wireless communication unit 410 may perform wired communication or wireless communication with a wearable device based on a set communication manner.

The mobile communication module 411 may transmit/receive a wireless signal to/from at least one of a base station, an external mobile station, and various servers (e.g., an integration server, a provider server, a content server, an Internet server, and a cloud server) on a mobile communication network. Examples of the wireless signal may include a voice call signal, a video call signal, and data in various forms according to the transmission and reception of text/multimedia messages.

The mobile communication module 411 may receive one or more data (for example, contents, a message, an e-mail, an image, a video, weather information, location information, and time information). According to an embodiment of the present invention, the mobile communication module 411 may be connected with at least one other electronic device (for example, the first external electronic device 102, the second external electronic device 104, or the server 106) connected with the electronic device 400 through a network (for example, a mobile communication network) to obtain (receive) various data. The mobile communication module 411 may transmit various data required for an operation of the electronic device 400 to the outside in response to a user request from a server and another electronic device.

The mobile communication module 411 may perform a communication function. For example, the mobile communication module 411 may convert a Radio Frequency (RF) signal into a baseband signal and provide the baseband signal to the control unit 480, or convert a baseband signal from the control unit 480 into an RF signal and transmit the RF signal under the control of the control unit 480. The control unit 480 may process the baseband signal based on various communication manners. For example, the communication manner may not be limited to, but may include a GSM manner, an Enhanced Data GSM Environment (EDGE) communication manner, a (CDMA) communication manner, a (W-CDMA) communication manner, an LTE communication manner, an Orthogonal Frequency Division Multiple Access (OFDMA) communication manner, a WiFi communication manner, a world interoperability for microwave access (WiMax) communication manner, or a Bluetooth communication manner.

The wireless LAN module 413 may represent a module for wirelessly accessing the Internet and forming a wireless LAN link with another electronic device 102 and 104, or the server 106. The wireless LAN module 413 may be embedded in or added to the electronic device 400. As a wireless Internet technology, WiFi, Wireless Broadband (WiBro), WiMax, High Speed Downlink Packet Access (HSDPA), or millimeter wave (mmWave) may be used.

The wireless LAN module 413 may transmit or receive one or more data selected by a user to or from the outside.

According to an embodiment of the present invention, the wireless LAN module 413 may obtain data from at least one of another electronic device (for example, a wearable device) or a server connected with the electronic device 400 through a network (for example, a wireless Internet network). The wireless LAN module 413 may transmit or receive various pieces of data of the electronic device 400 to or from the outside (for example, to a wearable device and a server) in response to a user request. The wireless LAN module 413 may transmit or receive various data corresponding to a user selection to or from another electronic device when a wireless LAN link is established with another electronic device. The wireless LAN module 413 may always be maintained in an on-state, or may be turned on according to a setting of the electronic device 400 or a user input.

The short-range communication module 415 may be a module for performing short-range communication. As a short-range communication technology, Bluetooth, Bluetooth Low Energy (BLE), Radio Frequency Identification (RFID), IrDA, Ultra WideBand (UWB), ZigBee, or NFC may be used.

The short range communication module 415 may receive one or more pieces of data. According to an embodiment of the present invention, the short range communication module 415 may obtain data from another electronic device connected with the electronic device 400 through a network (for example, a short range communication network). The short range communication module 415 may transmit or receive data corresponding to a user selection to or from another electronic device when connected with another electronic device via short range communication. The short range communication module 415 may always be maintained in an on-state, or may be turned on according to a setting of the electronic device 400 or a user input.

The location calculating module 417 is a module for obtaining a location of the electronic device 400, and a representative example thereof is a GPS. The location calculating module 417 may measure a location of the electronic device 400 by a triangulation principle. For example, the location calculating module 117 may calculate three-dimensional information on a current location according to a latitude, a longitude, and an altitude, by calculating information on a distance away from three or more base stations and time information, and then applying trigonometry to the calculated information. Instead, the location calculating module 417 may calculate location information by continuously receiving location information of the electronic device 400 from three or more satellites in real time. The location information of the electronic device 400 may be obtained by various methods.

The broadcast receiving module 419 may receive a broadcast signal (e.g., a TV broadcast signal, a radio broadcast signal, a data broadcast signal, and the like) and/or broadcast related information (e.g., information associated with a broadcast channel, a broadcast program, or a broadcast service provider) from an external broadcast management server through a broadcast channel (e.g., a satellite broadcast channel, a terrestrial broadcast channel, or the like).

The user input unit 420 may generate input data for controlling an operation of the electronic device 400 in response to a user input. The user input unit 420 may include one or more input means for detecting various inputs of a user. For example, the user input unit 420 may include a key pad, a dome switch, a physical button, a touch pad (capacitive/resistive), jog & shuttle, and a sensor (for example, the sensor module 240 of FIG. 2).

A part of the user input unit 420 may be implemented in a button form outside the electronic device 400, or a part or the entirety of the user input unit 420 may be implemented by a touch panel. The user input unit 420 may receive a user input for initiating an operation of the electronic device 400 according to various embodiments of the present invention, and generate an input signal according to the user input. For example, the user input unit 420 may receive various user inputs for performing a connection of a wearable device, execution of a manager for setting a background color of a wearable device, photographing of an image, execution of an application, data input (write and insertion), posture change of the electronic device 400, contents display, or data transmission or reception, and generate an input signal according to the user input.

The touch screen 430 represents an input/output means capable of simultaneously performing an input function and a display function, and may include a display unit 431 (for example, the displays 160 and 260 of FIGS. 1 and 2, respectively) and a touch detecting unit 433. The touch screen 430 may provide an input/output interface between the electronic device 400 and a user, transmit a user input of a user to the electronic device 400, and serve as a medium displaying an output from the electronic device 400 to a user. The touch screen 430 may display a visual output to a user. The visual output is represented in a form of text, a graphic, video, or a combination thereof. For example, in an embodiment of the present invention, the touch screen 430 may display various screens, according to an operation of the electronic device 400, through the display unit 431. For example, the various screens may include a messenger screen, a call screen, a game screen, a video reproduction screen, a gallery screen, a web page screen, a home screen, or a network connection screen.

The touch screen 430 may detect an event (for example, a touch event, a hovering event, or an air gesture event) based on at least one of a touch, hovering, and an air gesture from a user through the touch detecting unit 433, while displaying a specific screen through the display unit 431, and may transmit an input signal according to the event to the control unit 480. The control unit 480 may determine the received event, and control the performance of an operation according to the event.

According to an embodiment of the present invention, the display unit 431 may display (output) various information processed by the electronic device 400. For example, the display unit 431 may display a UI or a GUI related to a voice recording when the electronic device 400 is operated in a recording mode, and may display a UI or a GUI related to a color correction mode when the electronic device 400 is operated in the color correction mode. Further, the display unit 431 may display a UI or a GUI related to a call when the electronic device 400 is in a call mode. The display unit 431 may display a photographed and/or received image and a UI or a GUI related to a corresponding mode operation when the electronic device 400 is in a video call mode or a photographing mode. The display unit 431 may display at least one of data related to the use of the electronic device 400, contents, and information about other electronic devices (for example, a wearable device) connected with a network. The display unit 431 may display various application execution screens corresponding to an executed application.

The display unit 431 may support a screen display in a horizontal mode, a screen display in a vertical mode, and a screen display according to a change between the horizontal mode and the vertical mode based on a rotation direction of the electronic device 400. Various displays (for example, the display 160 of FIG. 1) may be used as the display unit 431. Some displays may be implemented by a transparent display or an optical transmissive transparent display.

The touch detecting unit 433 may be disposed on the display unit 431, and may detect a user input that is in contact with or approaches a surface of the touch screen 430. The user input may include a touch event or a proximity event that is input based on at least one of a single touch, a multi-touch, hovering, and an air gesture. For example, the user input may be a tap, drag, sweep, flick, drag & drop, or drawing gesture (for example, writing). The touch detecting unit 433 may detect a user input (for example, a touch event or a proximity event) on the surface of the touch screen 430, may generate a signal corresponding to the detected user input, and may transmit the generated signal to the control unit 480. The control unit 480 may control the execution of a function corresponding to a region, in which a user input (for example, a touch event or a proximity event) is generated, by the signal transmitted from the touch detecting unit 433.

According to an embodiment of the present invention, the touch detecting unit 433 may receive a user input for initiating an operation related to the use of the electronic device 400, and may generate an input signal according to the user input. The touch detecting unit 433 may be configured to convert a pressure applied to a specific portion of the display unit 431 or a change in capacitance and the like generated at a specific portion of the display unit 431 into an electrical input signal. The touch detecting unit 433 may detect a position and an area of a touch or proximity of an input means (for example, a finger of a user and an electronic pen) to a surface of the display unit 431. Further, the touch detecting unit 433 may be implemented so as to detect even pressure at the time of a touch according to an applied touch manner. When a touch or a proximity input is input into the touch detecting unit 433, one or more signals corresponding to the touch or the proximity input may be transmitted to a touch screen controller. The touch screen controller may process the one or more signals and then transmit corresponding data to the control unit 480. Accordingly, the control unit 480 may confirm a region of the touch screen 430, into which the touch or the proximity input is input, and process execution of a function corresponding to the touch or the proximity input.

The audio processing unit 440 may be configured to be the same as or similar to the audio module 280 of FIG. 2. The audio processing unit 440 may transmit an audio signal received from the control unit 480 to a speaker (SPK) 441, and may transmit an audio signal, such as a voice, received from a microphone (MIC) 443 to the control unit 480. The audio processing unit 440 may convert voice/sound data into an audible sound and output the audible sound through the speaker 441 under the control of the control unit 480. The audio processing unit 440 may also transmit an audio signal, such as a voice, received from the microphone 443 into a digital signal and transmit the digital signal to the control unit 480. The audio processing unit 440 may output an audio signal responding to a user input according to audio processing information (for example, an effect sound and a music file) inserted into data.

The speaker 441 may output audio data received from the wireless communication unit 410 or stored in the storage unit 450. The speaker 441 may also output a sound signal related to various operations (functions) performed by the electronic device 400. The speaker 441 may output an audio stream, such as, for example, voice recognition, voice copying, digital recording, and call function. According to an embodiment of the present invention, the speaker 441 may include an attachable and detachable ear phone, head phone, or head set, which may be connected to the electronic device 400 through an external port.

The microphone 443 may receive an external sound signal and process the received sound signal into sound data. When the electronic device 400 is in the call mode, sound data processed through the microphone 443 may be converted into a form transmittable to the outside through the mobile communication module 411, and may then be output. Various noise reduction algorithms for removing noise generated in the process of receiving an external sound signal may be implemented in the microphone 443. The microphone 443 may input an audio stream, such as, for example, a voice command (for example, a voice command for initiating a color correction operation of the electronic device 400), voice recognition, voice copying, digital recording, and a call function.

The microphone 443 may be composed of a plurality of microphones (for example, a first microphone, a second microphone, and a third microphone) by which a directivity pattern may be represented based on a specific arrangement. The electronic device 400 including the plurality of microphones may determine a direction based on at least some of a time of a voice input to the microphone, a distance, or an intensity (in decibels) of sound, and determine a speaker according to the determined direction. According to an embodiment of the present invention, the microphone 443 may include an embedded microphone mounted inside the electronic device 400 or an add-on microphone connected to the electronic device 400.

The storage unit 450 (for example, the memory 130 or 230 of FIGS. 1 and 2, respectively) may store one or more programs executed by the control unit 480, and also temporarily store input/output data. The input/output data may include, for example, a color code (for example, a hexadecimal color code classification table), a adjusted color value, a color code, contents, messenger data, conversation data, contact information such as a telephone number, messages, and media files such as audio, video, and image files. The storage unit 450 may store various programs and data related to a color correction function of the electronic device 400. For example, in an embodiment of the present invention, the storage unit 450 may store one or more programs that process the adjusting and setting of a background color of a wearable device based on a photographed image in a preview state, and data processed according to the programs.

The storage unit 450 may store, together, a use frequency (for example, a color use frequency, an application use frequency, and a content use frequency), an importance, and a priority according to an operation of the electronic device 400. The storage unit 450 may also store data related to a vibration and a sound of various patterns output in response to a touch input or a proximity input on the touch screen 430. The storage unit 450 may continuously or temporarily store an OS of the electronic device 400, a program related to input and display control using the touch screen 430, a program related to the control of various operations (functions) of the electronic device 400, various data generated by an operation of each program, and the like.

The storage unit 450 (for example, the memories 130 and 230 of FIGS. 1 and 2, respectively) may include an extended memory (for example, the external memory 234 of FIG. 2) or an internal memory (for example, the internal memory 232 of FIG. 2). The electronic device 400 may also operate in relation to a web storage performing a storage function of the storage unit 450 on the Internet.

The storage unit 450 may store various software. For example, a software configuration element may include an operating system software module, a communication software module, a graphic software module, a user interface software module, a Moving Picture Experts Group (MPEG) module, a camera software module, or one or more application software modules. Further, the module that is the software configuration element may be expressed with a set of instructions. The module is also expressed as a program. In an embodiment of the present invention, the storage unit 450 may include additional modules (instructions) in addition to the aforementioned module, or may not use some modules (instructions).

The operating system software module may include various software configuration elements controlling a general system operation. The control of the general system operation may refer to, for example, memory management and control, storage hardware (device) management and control, and power management and control. Further, the operating system software module may perform a function of facilitating communication between various pieces of hardware (devices) and the software configuration element (module).

The communication software module may enable the electronic device 400 to communicate with another electronic device, such as, for example, a wearable device, a computer, a server, or a portable terminal, through the wireless communication unit 410. Further, the communication software module may be formed in a protocol structure corresponding to a corresponding communication manner.

The graphic software module may include various software configuration elements for providing and displaying graphic on the touch screen 430. The term "graphics" is used to mean text, web page, icon, digital image, video, and animation.

The user interface software module may include various software configuration elements related to a UI. For example, the user interface software module may include contents related to how a state of a UI is changed or a condition under which a state of a UI is changed.

The MPEG module may include a software configuration element enabling processes and functions (for example, generation, reproduction, distribution, and transmission of contents) related to digital contents (for example, a video and an audio) to be performed.

The camera software module may include a camera related software configuration element enabling camera-related processes and functions to be performed.

The application module may include a browser including a rendering engine, email, instant messaging, word processing, keyboard emulation, an address book, a touch list, a widget, Digital Rights Management (DRM), voice recognition, voice copy, a position determining function, and a location based service. According to an embodiment of the present invention, the application module may include commands for setting a background color of a wearable device. For example, the application module may provide reference color information recognized in a preview state when a background color of a wearable device is set, and a process of adjusting and setting the background color of the wearable device so as to correspond to the reference color.

The interface unit 460 may be configured to be the same as or similar to the interface 270 of FIG. 2 of FIG. 2. The interface unit 460 may serve as an interface with all of the external devices connected with the electronic device 400. The interface unit 460 may receive data or receive power from an external device, and transmit the received data or power to each element of the electronic device 400, or transmit data within the electronic device 400 to an external device. For example, the interface unit 460 may include a wired/wireless headset port, an external charger port, a wired/wireless data port, a memory card port, a port for connecting a device provided with an identification module, an audio input/output port, a video input/output port, an earphone port, and the like.

The camera module 470 (for example, the camera module 291 of FIG. 2) supports a photographing function of the electronic device 400. The camera module 470 may support photographing of an image (a still image or a video) of a subject. The camera module 470 may photograph a predetermined subject under the control of the control unit 480, and transmit the photographed data to the display unit 431 and the control unit 480. The camera module 470 may include an image sensor (or a camera sensor) for converting an input photo signal into an electric signal, and an image signal processing unit for converting the electric signal input from the image sensor into digital image data. The image sensor may include a sensor using a Charge-Coupled Device (CCD) or a Complementary Metal-Oxide-Semiconductor (CMOS). Additionally or alternatively, the camera module 470 may include, for example, a color sensor detecting a wavelength of light radiated or reflected by an object and determining a color. The camera module 470 may support an image processing function that supports photographing according to various photographing options (e.g., zooming, a screen ratio, an effect (e.g., sketch, mono, sepia, vintage, mosaic, and a picture frame)) in accordance with a user's settings. According to an embodiment of the present invention, the camera module 470 may photograph a reference object and a subject (object) corresponding to a target object, and transmit the photographed objects to the display unit 431 and the control unit 480.

The controller 480 may control a general operation of the electronic device 400. For example, the control unit 480 may perform control related to voice communication, data communication, and video communication. The control unit 480 may include one or more processors or the control unit 480 may be referred to as a processor. For example, the control unit 480 may include a CP, an AAP, an interface (for example, General Purpose Input/Output (GPIO)), or an internal memory as a separate element, or may be integrated into a single IC. The application processor may perform various functions for the electronic device 400 by executing various software programs, and the communication processor may perform processing and control for voice communication and data communication. Further, the control unit 480 may serve to execute a specific software module (instruction set) stored in the storage unit 450 and perform various specific functions corresponding to the module.

According to an embodiment of the present invention, the control unit 480 may control an operation related to performance of a color correction function. For example, the control unit 480 may process an image (for example, clothes, a bag, or skin, or a wearable device) photographed in a preview state through the camera module 470, and differentiate a reference object from a target object. In an embodiment of the present invention, the reference object may include, for example, a user's clothes, skin, a bag, or an accessory of a user, as an object that has a reference color required for a color correction. The target object is an object for setting a background color so as to be identical to a reference color of the reference object, and may include, for example, a wearable device.

According to an embodiment of the present invention, the control unit 480 may transmit a wake-up signal to a wearable device, connected using a predetermined communication manner, in response to an execution of a manager of a user, and the wearable device may display a background color currently set in the wearable device on the display unit in response to the reception of the wake-up signal. Additionally or alternatively, when the wearable device receives the wake-up signal from the electronic device 400 while in an off-state, the wearable device may perform an operation of turning on the display unit.

The control unit 480 may differentiate a reference object from a target object based on an image trace, such as, for example, an object recognition technology and an image recognition technology. According to an embodiment of the present invention, the control unit 480 may recognize a kind, a form, a color, or a characteristic of a corresponding image from the image input in the preview state through the camera module 470 based on the image trace.

Further, according to another embodiment of the present invention, the control unit 480 may differentiate a reference object from a target object based on a predetermined input. For example, when a first touch and a second touch are sequentially input from a user in the preview state, the control unit 480 may recognize an image in a first region, in which the first touch input is detected, as a reference object, and an image in a second region, in which the second touch input is detected, as a target object. Alternatively, when a touch gesture (for example, a drag & drop input) is input from a user in the preview state, the control unit 480 may recognize an image in a first region, in which the touch gesture is touched down, as the reference object, and may recognize an image in a second region, in which the touch gesture is released, as the target object.

The control unit 480 may confirm a reference color of the reference object, and set a background color of the target object so as to be identical to the reference color. According to an embodiment of the present invention, when it is assumed that the reference color of the reference object is blue, and the background color of the target object is yellow, the control unit 480 may photograph and compare the blue of the reference object and the yellow of the target object in a preview, and sequentially tune the background color so that the yellow of the target object corresponds to the blue of the reference object.

According to an embodiment of the present invention, the control unit 480 may photograph a reference color of a reference object and a background color of a target object as a background in the preview state. The control unit 480 may compare the colors of the photographed images (for example, the reference object image and the target object image), and when it is determined that the photographed images are different from each other, the control unit 480 may sequentially adjust the background color so as to correspond to the determined (recognized) reference color. According to an embodiment of the present invention, the control unit 480 may recognize a color corresponding to the reference color of the reference object and temporarily set the recognized color as a background of the target object, and control the target object to be displayed with the temporarily set background color. Further, the control unit 480 may compare the reference color and the temporarily set background color again, and sequentially adjust the background color according to a correspondence degree between the reference color and the temporarily set background color, or finally set the background color of the target object.

The operation of adjusting the background color of the target object is described in greater detail below.

According to an embodiment of the present invention, in the temporary setting of the background color for the target object, the control unit 480 of the electronic device 400 may overlay and display a background color graphic desired to be turned on the target object using an Augmented Reality (AR) technology, and may photograph the reference color and the overlaid background color graphic and perform image comparison. Alternatively, according to an embodiment of the present invention, the control unit 480 may extract a color code corresponding to a reference color, and transmit the extracted color code to a wearable device that is a target object, and control a background color of the wearable device to be temporarily changed to a color corresponding to the color code. The wearable device may change and display the background color corresponding to the color code and then transmit a response signal to the electronic device 400. When the control unit 480 receives the response signal from the wearable device, the control unit 480 may photograph a reference object and a target object and compare images.

According to an embodiment of the present invention, when the control unit 480 adjusts the background color of the target object again, for example, when the control unit 480 compares the first adjusted background color with the reference color, and the adjusted background color is not identical to the reference color, the control unit 480 may secondarily adjust the background color by adjusting the adjusted background color. For example, the control unit 480 may adjust the background color by increasing or decreasing the color code of the adjusted background color so as to correspond to the color code of the reference color based on the color code corresponding to the adjusted background color and the color code of the reference color. The control unit 480 may increase or decrease according to a degree difference between the color code of the reference code and the color code of the background color.

According to an embodiment of the present invention, the control unit 480 may connect to the wearable device by wired or wireless communication, and the control unit 480 may transceive the color code corresponding to the reference color recognized by the electronic device 400 or the color code corresponding to the background color of the wearable device recognized by the electronic device 400.

According to an embodiment of the present invention, the control unit 480 may perform the aforementioned color correction operation of the electronic device 400 in connection with the software modules stored in the storage unit 450. Further, according to an embodiment of the present invention, the control unit 480 may be implemented by one or more modules capable of processing the various functions. According to an embodiment of the present invention, the control unit 480 may be implemented by one or more processors controlling the operation of the electronic device 400 by executing one or more programs stored in the storage unit 450. For example, the control unit 480 may include at least one of an image processing module, an image tracing module, a color correcting module, a color extracting module, a text-voice converting module, and a data transmitting module.

The control unit 480, according to an embodiment of the present invention, may control various operations related to the general function of the electronic device 400 in addition to the aforementioned functions. For example, when a specific application is executed, the control unit 480 may control the operation and display of a screen for the specific application. Further, the control unit 480 may receive input signals corresponding to input of various touch events or proximity events supported by a touch-based or proximity-based input interface (for example, the touch screen 430), and may control an operation of a function corresponding to the input signal. Further, the control unit 480 may also control transmission/reception of various data based on wired communication or wireless communication.

The power supply unit 490 may receive external power or internal power under the control of the control unit 480, and may supply power required for operations of various elements. According to an embodiment of the present invention, the power supply unit 490 may supply power to the wearable device or block power under the control of the control unit 480.

Embodiments of the present invention may be implemented in a recording medium, which can be read through a computer or a similar device, by using software, hardware, or a combination thereof. According to the hardware implementation, embodiments of the present invention may be implemented using at least one of Application Specific Integrated Circuits (ASICs), Digital Signal Processors (DSPs), Digital Signal Processing Devices (DSPDs), Programmable Logic Devices (PLDs), FPGAs, processors, controllers, micro-controllers, micro-processors, and electrical units for performing other functions.

According to an embodiment of the present invention, the recording medium may include a computer readable recording medium recording a program for executing an operation of differentiating a reference object and a target object from an image displayed as a preview, an operation of determining a reference color of the reference object and a background color of the target object, an operation of adjusting the background color of the target object so as to correspond to the reference color of the reference object, and an operation of setting the background color of the target object based on a result of the adjusting operation.

Embodiments described herein may be implemented by the controller 180 of FIG. 1. Furthermore, according to the software implementation, procedures and functions described herein may also be implemented as separate software modules. The software modules may perform one or more functions and operations described herein.

According to an embodiment of the present invention, some of the functions performed by the electronic device 400 may be performed by an external device (for example, the server 106 of FIG. 1). For example, the server 106 of FIG. 1 may include a processing module corresponding to the control unit 480, and may process some of the functions related to a comparison between the reference color and the background color, may adjust the background color by using the processing module, and may transmit a result of the processing to the electronic device 400.

As described above, the electronic device 400, according to an embodiment of the present invention, may include the communication unit 410 that performs communication with a wearable device by a predetermined communication method, the camera module 470 that photographs subjects corresponding to a reference object and a target object, the display unit 431 that displays the images of the subjects input through the camera module 470, and the control unit 480 that controls the image to be displayed as a preview, differentiating the reference object and the target object in the image displayed as the preview, and sets a background color of the target object so as to correspond to a reference color of the reference object.

As described above, the electronic device 400, according to an embodiment of the present invention does not simply change the background color of the wearable device to a color close to the reference color, but adjusts the background color by substantially comparing the reference color of the reference object with the background color of the wearable device, and accordingly, the background color of the wearable device may be identical to the reference color of the reference object in an actual visual part.

Figure 5:
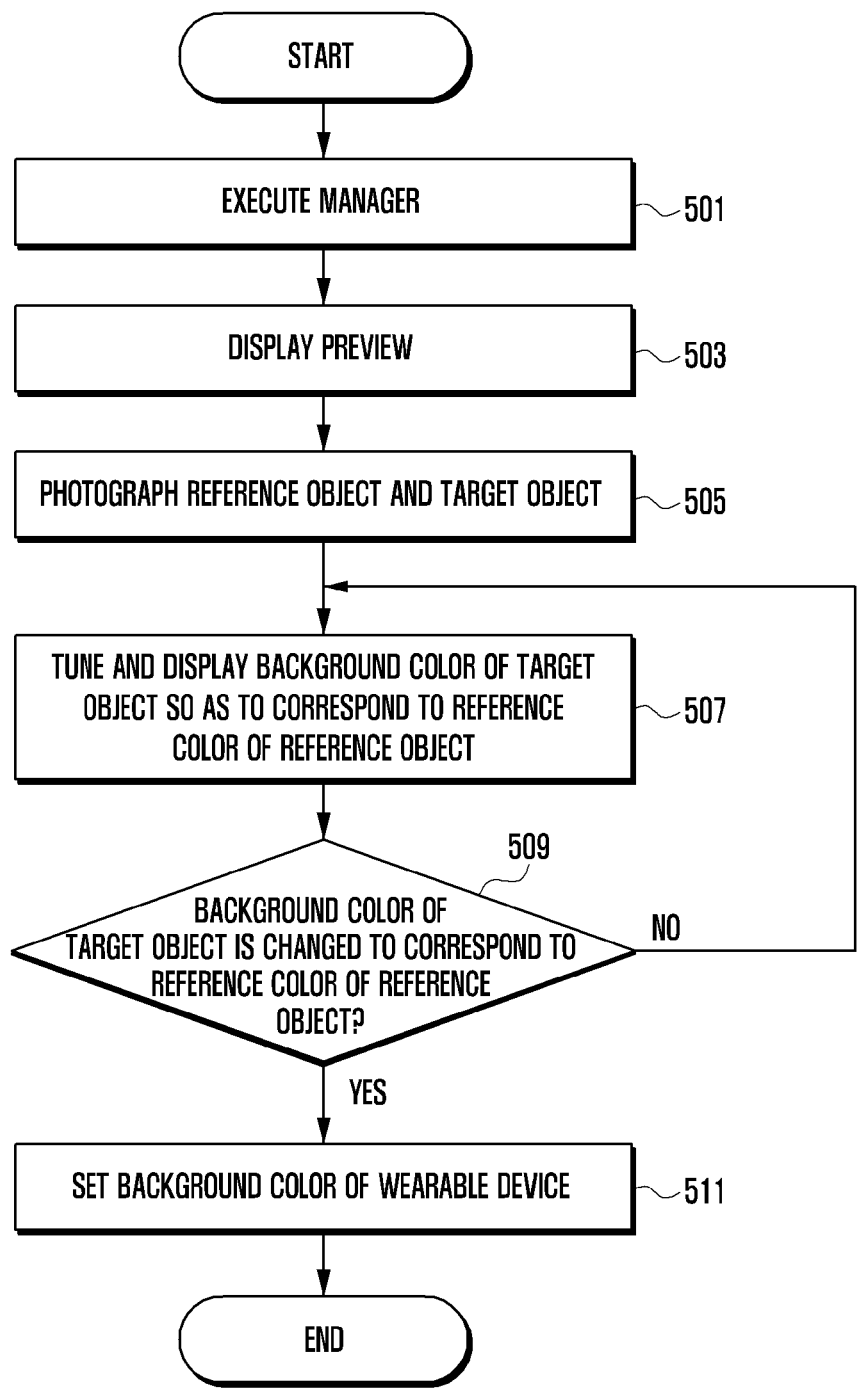
FIG. 5 is a flowchart illustrating an operation procedure of setting a background color of a wearable device by an electronic device, according to an embodiment of the present invention.

FIG. 5 is a flowchart illustrating an operation procedure of setting a background color of a wearable device by the electronic device, according to an embodiment of the present invention.

Referring to FIG. 5, in step 501, the control unit 480 executes a manager for performing a color correction function in response to a user input. In an embodiment of the present invention, the manager may include an application for initiating an operation of automatically setting, by the electronic device 400, a background color of a wearable device, which is connected with the electronic device 400 using a predetermined communication manner. According to an embodiment of the present invention, the manager may be an application that is installable for a color correcting function or that is operated as a function added to the camera application for operating the camera module 470.

In step 503, the control unit 480 displays a preview in response to the execution of the manager. According to an embodiment of the present invention, the control unit 480 may control the camera module 470 to be turned on in response to the execution of the manager, and may display an image of a subject input through the camera module 470 on a preview screen. In an embodiment of the present invention, the image of the subject may include a reference object, such as, for example, clothes of a user, skin of the user, and a bag of the user, and a target object, such as, for example, the wearable device.

In step 505, the control unit 480 simultaneously photographs the images of the subjects (for example, the reference object and the target object) in a preview state. According to an embodiment of the present invention, the control unit 480 may photograph a subject corresponding to a reference object and a subject corresponding to a target object as a background in a preview state. The photographing of the image of the subjects may be automatically performed in response to the differentiation of the reference object and the target object.

In step 507, the control unit 480 adjusts and displays a background color of the target object so as to correspond to a reference color of the photographed reference object. According to an embodiment of the present invention, the control unit 480 may differentiate the reference object from the target object by analyzing a first image (for example, the clothes of the user) and a second image (for example, the wearable device) photographed (captured) in the preview state, and extract a color (for example, a reference color and a background color) from each of the differentiated reference object and target object, by adjusting the background color of the target object so as to correspond to the extracted reference color of the reference object, and by processing the adjusted background color as a background. The control unit 480 may display the adjusted background color of the target object as a preview according to a procedure set when the background color of the target object is adjusted. An operation of adjusting and displaying the background color of the target object is described in greater detail below.

In step 509, the control unit 480 compares the reference color of the reference object and the adjusted background color of the target object, and determines whether the background color of the target object is changed so as to correspond to the reference color of the reference object. According to an embodiment of the present invention, the comparison between the reference color and the background color may be performed by extracting a color code of each of the reference color and the background color, and determining whether the color code of the background color is included within an error range set in the color code of the reference color by comparing the extracted color codes.

When the reference color of the reference object is different from the background color of the target object ('No' in step 509), the control unit 480 returns to 507 and adjusts the background color by increasing/decreasing the background color of the target object.

When the reference color of the reference object is the same as the background color of the target object ('Yes' in step 509), the control unit 480 automatically sets the background color of the target object (for example, the wearable device) based on the selected color (for example, the adjusted color), in step 511. The operation of automatically setting the background color of the target object based on the adjusted color will be described in detail with reference to the drawings below.

Figure 6:
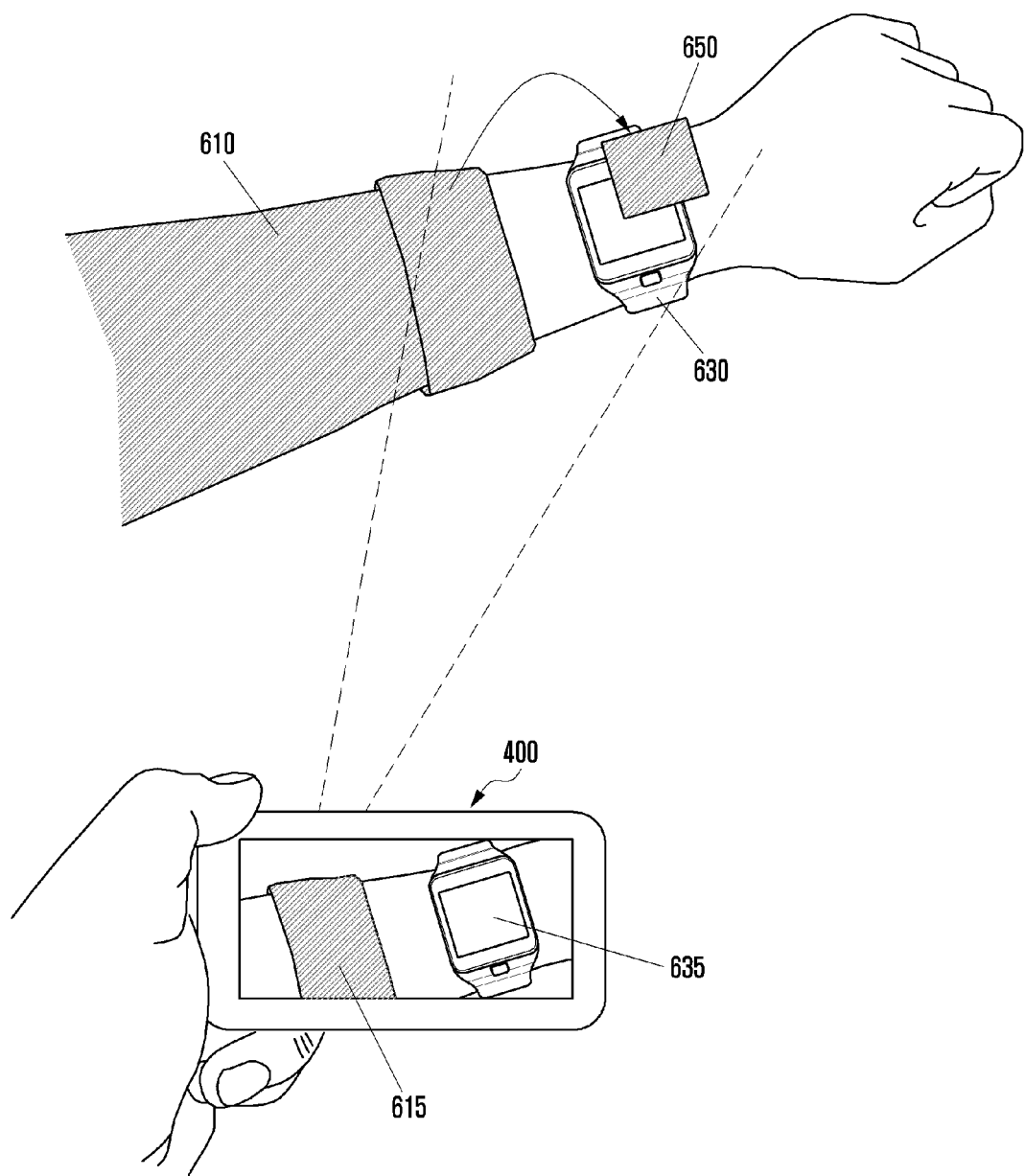
FIG. 6 is a diagram illustrating an operation of setting a background color of a wearable device by the electronic device, according to an embodiment of the present invention.

FIG. 6 is a diagram illustrating an operation of setting a background color of a wearable device by the electronic device, according to an embodiment of the present invention.

Referring to FIG. 6, a user may execute a manager by operating the electronic device 400. When execution of the manager is detected, the electronic device 400 may drive the camera module 470, photograph a subject through the camera module 470, and display a preview screen.

According to an embodiment of the present invention, the user may simultaneously photograph clothes 610 and a wearable device 630. The wearable device 630 may perform a wake-up operation under the control of the electronic device 400 during execution of the manager by the electronic device 400, and may display a background color 650 set in the wearable device 630 through a display unit of the wearable device 630 in response to the wake-up operation.

The electronic device 400 may display images corresponding to the clothes 610 of the user and the wearable device 630 (a first image 615 of the clothes 610 of the user and a second image 635 of the wearable device 630) as a preview. The electronic device 400 may identify a color of the first image 615 and a color of the second image 635 of the preview by processing the images, and adjust the color of the second image 635 (for example, the background color 650 of the wearable device 630) based on the color of the first image 615 (for example, the color of the clothes 610 of the user). The electronic device 400 may repeatedly perform the adjusting operation (for example, the increasing/decreasing and displaying of the background color of the wearable device 630) so that the background color of the wearable device 630 is changed to the same color as the color of the clothes of the user.

The electronic device 400 may reflect the background color of the wearable device 630 adjusted according to the adjusting operation to the second image 635 and display the second image 635.

According to an embodiment of the present invention, the electronic device 400 may generate a virtual object corresponding to the adjusted background color, and overlay the virtual object on the second image 635 corresponding to the wearable device 630 based on an AR technology, and may display the virtual object. The electronic device 400 may display the changed background color of the wearable device 630 through a preview, and a user may intuitively recognize the reference color and the background color through the preview. In an embodiment of the present invention, the virtual object may recognize the second image 635 by, for example, tracing an image, and include a virtual image generated so as to correspond to a shape of the recognized second image 635.

According to an embodiment of the present invention, the electronic device 400 may temporarily set the background color by transmitting the adjusted background color to the wearable device 630, and the wearable device 630 may display the temporarily set background color through the display unit of the wearable device 630 under the control of the electronic device 400. The electronic device 400 may display the changed background color of the wearable device 630 through a preview, and a user may intuitively recognize the reference color and the background color through the preview.

When it is confirmed that the color of the first image 615 is the same as the same as the color of the second image 635 through the aforementioned operation, the electronic device 400 may automatically set the background color of the wearable device 630 based on the adjusted color. According to an embodiment of the present invention, the electronic device 400 may transmit a color code corresponding to the finally adjusted color and a command for setting a background color by the color code to the wearable device 630 through predetermined communication, and the wearable device 630 may set the background color in response to the control of the electronic device 400.

Figure 7:
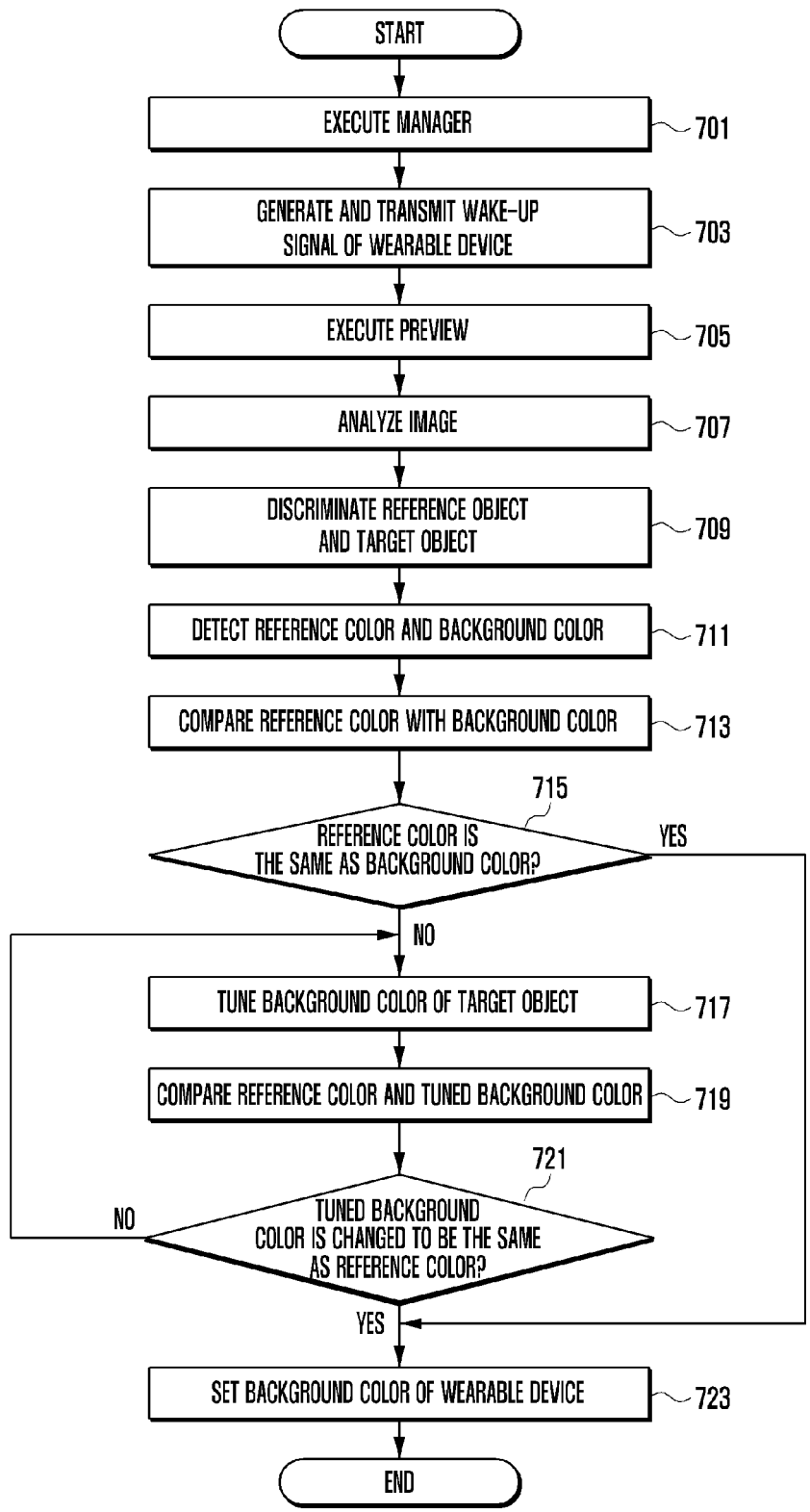
FIG. 7 is a flowchart illustrating an operation procedure of setting a background color of a wearable device by the electronic device, according to an embodiment of the present invention.

FIG. 7 is a flowchart illustrating an operation procedure of setting a background color of a wearable device by the electronic device, according to an embodiment of the present invention.

Referring to FIG. 7, in step 701, the control unit 480 executes a manager for performing a color correction function in response to a user input.

In step 703, the control unit 480 processes a wake-up operation of a wearable device in response to the execution of the manager. According to an embodiment of the present invention, the electronic device 400 and the wearable device may be connected based on a predetermined manner of communication. The control unit 480 of the electronic device 400 may generate a signal for waking up the pre-connected wearable device when executing the manager, and may transmit the generated signal to the wearable device through the wireless communication unit 410 using the predetermined manner of communication. According to an embodiment of the present invention, the control unit 480 may determine whether the wearable device is connected when the manager is executed. When it is determined that the wearable device is not connected, the control unit 480 may also search for and connect to the wearable device.

In step 705, the control unit 480 displays a preview in response to the execution of the manager. According to an embodiment of the present invention, the control unit 480 may process step 703 in the background together with step 705. The control unit 480 may display an image of a subject input through the camera module 470 (for example, a reference object, such as clothes of a user, skin of the user, and a bag of the user, and a target object, such as a wearable device) through a preview screen.

In step 707, the control unit 480 analyzes the image in the preview state. According to an embodiment of the present invention, the control unit 480 may recognize a kind, a form, a color, or a characteristic from the image input as the preview based on image tracing (for example, object recognizing technology and image recognizing technology).

According to an embodiment of the present invention, the control unit 480 may sequentially scan an input image input through the camera module 470, differentiate a background region (for example, the region that remains when the reference object is removed based on the user and the target object of the wearable device) and an object region (for example, a reference object region based on the user and a target object region of the wearable device). The control unit 480 may process and analyze the image based on image tracing in the object region.

In step 709, the control unit 480 differentiates the reference object and the target object in the image of the preview based on the analysis of the image. According to an embodiment of the present invention, the control unit 480 may identify the wearable device in response to the analysis of the image, may determine the identified wearable device as the target object, and may identify the clothes of the user from the remaining portion of the image, and may determine the identified clothes of the user as the reference object. Alternatively, the control unit 480 may differentiate the reference object and the target object based on a predefined user input in the preview state. According to an embodiment of the present invention, the control unit 480 may recognize an image in a first region, in which a first touch input is detected, as the reference object, and may recognize an image in a second region, in which a second touch input is detected, as a target object in the preview state. Alternatively, when a touch gesture (for example, a drag & drop input) is input in the preview state, the control unit 480 may recognize an image in a first region, in which the touch gesture is touched down, as the reference object, and may recognize an image in a second region, in which the touch gesture is released, as the target object.

According to an embodiment of the present invention, the control unit 480 may provide guide information about the reference object and the target object differentiated according to the analysis of the image. For example, the control unit 480 may display text, an icon, and the like, on the images corresponding to the reference object and the target object recognized by the control unit 480 based on AR, and may receive a selection indicating a user confirmation.

In step 711, the control unit 480 detects a reference color and a background color from the reference object and the target object, respectively. For example, the control unit 480 may detect a wavelength of light irradiated by or reflected from the object by using the camera module 470, and may determine a color of the clothes of the user and a background color of the wearable device.

The control unit 480 compares the reference color of the reference object with the background color of the target object, in step 713, and determines whether the reference color is the same as the background color, in step 715. According to an embodiment of the present invention, the control unit 480 may recognize and compare the reference color of the reference object and the background color of the target object detected by the control unit 480 based on Hue, Saturation, and Value (HSV) or Hue, Saturation, and Brightness (HSB), and may determine a degree by which the reference color of the reference object differs from the background color of the target object.

When it is determined that the reference color is the same as the background color ('YES' in step 715), the control unit 480 proceeds to step 723 and sets the background color of the wearable device. For example, the control unit 480 may transmit a control signal to the wearable device for maintaining the currently set background color or for setting the background color.

When it is determined that the reference color is different from the background color ('NO' in step 715), the control unit 480 adjusts the background color of the target object, in step 717. For example, the control unit 480 may increase or decrease a color value of the background color of the target object so as to correspond to the reference color of the reference object. According to an embodiment of the present invention, the control unit 480 may change a degree of adjustment of the background color based on the HSV or the HSB. According to an embodiment of the present invention, the control unit 480 may temporarily change the background color of the wearable to a adjusted color value when the background color of the target object is adjusted, or may display a virtual object with the color adjusted based on AR.

The control unit 480 compares the reference color with the adjusted background color, in operation 719, and determines whether the adjusted background color is changed to be the same as the reference color, in step 721.

When it is determined that the adjusted background color has not been changed to be the same as the reference color ('NO' in step 721), the control unit 480 returns to step 717 and repeats the subsequent operations. When it is determined that the adjusted background color is changed to be the same as the reference color ('YES' in step 721), the control unit 480 proceeds to step 723 and sets the background color of the wearable device.

Figure 8:
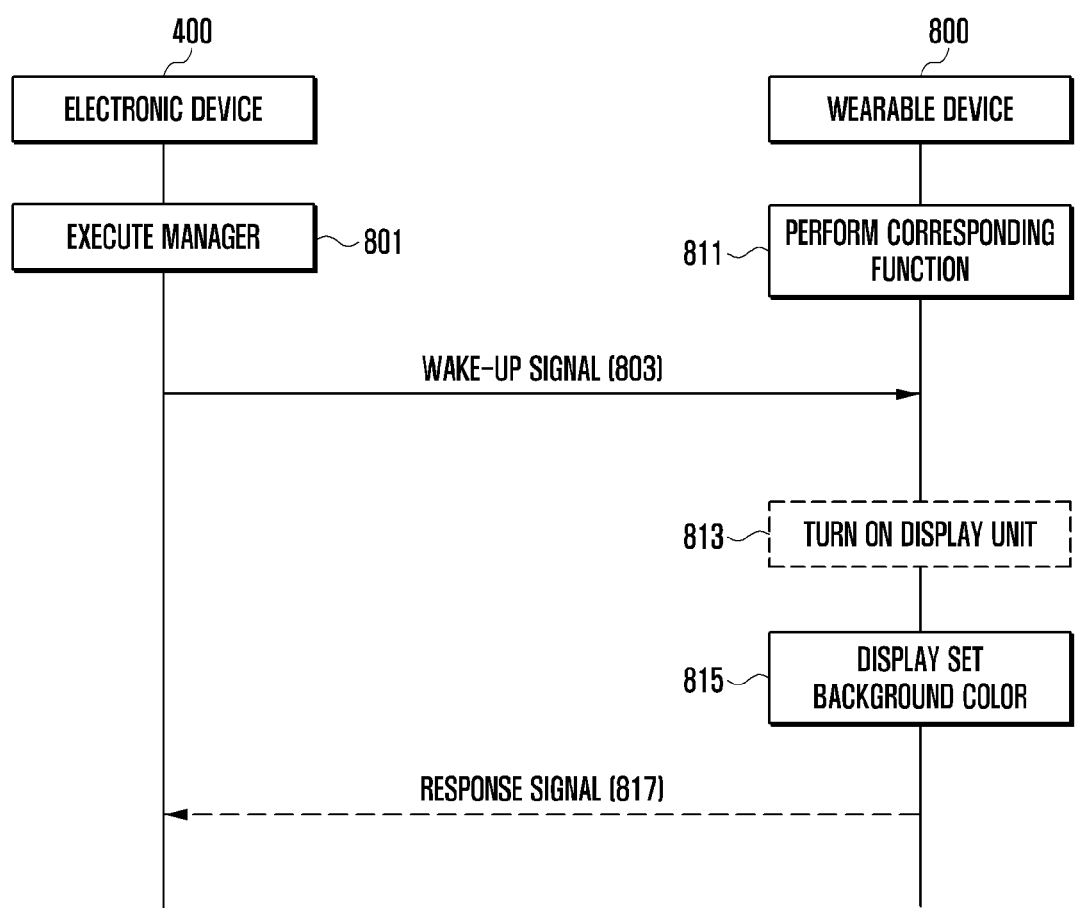
FIG. 8 is a diagram illustrating an operation between a wearable device and the electronic device, according to an embodiment of the present invention.

FIG. 8 is a diagram illustrating an operation between a wearable device and the electronic device, according to an embodiment of the present invention.

Referring to FIG. 8, the electronic device 400 wakes up a wearable device 800, and the wearable device 800 is awoken in response to the wake-up of the electronic device 400.

As illustrated in FIG. 8, in step 801, the electronic device 400 executes a manager in response to a user input. In step 803, the electronic device 400 transmits a wake-up signal to the wearable device 800, which is connected to the electronic device 400 through a predetermined manner of communication. According to an embodiment of the present invention, the electronic device 400 may determine whether the wearable device 800 is connected when the manager is executed, and when the wearable device 800 is not connected, the electronic device 400 may also search for and connect to the wearable device 800.

In step 811, the wearable device 800 performs a corresponding operation. According to an embodiment of the present invention, the wearable device 800 may perform an operation of waiting for the generation of a specific event in a state where a display unit is turned off, an operation of displaying a screen related to an operation by a user, or an operation of displaying a relevant screen while processing a specific event with the connected electronic device 400.

When the wearable device 800 receives the wake-up signal from the electronic device 400 while performing the corresponding operation, the wearable device 800 may turn on the display unit, in step 813. In an embodiment of the present invention, when the wearable device 800 performs the corresponding operation with the display in the turned-on state, step 813 may be omitted.

In step 815, the wearable device 800 displays a currently set background color through the display unit in response to the wake-up signal. According to an embodiment of the present invention, the wearable device 800 may display the background color on the entire screen of the display unit, or may change only a background based on the set background color and display the background while displaying a relevant UI in response to the currently performed corresponding operation.

In step 817, the wearable device 800 may change the background color, and send a response signal responding to the wake-up signal of the electronic device 400 to the electronic device 400. The electronic device 400 may perform an image processing operation of comparing and analyzing the reference color and the background color in response to the response signal of the wearable device 800. In an embodiment of the present invention, step 817 may be omitted, and the electronic device 400 may detect a change in the background color of the wearable device 800 through a color recognizing operation, and may automatically perform a comparison and analysis operation.

Figure 9:
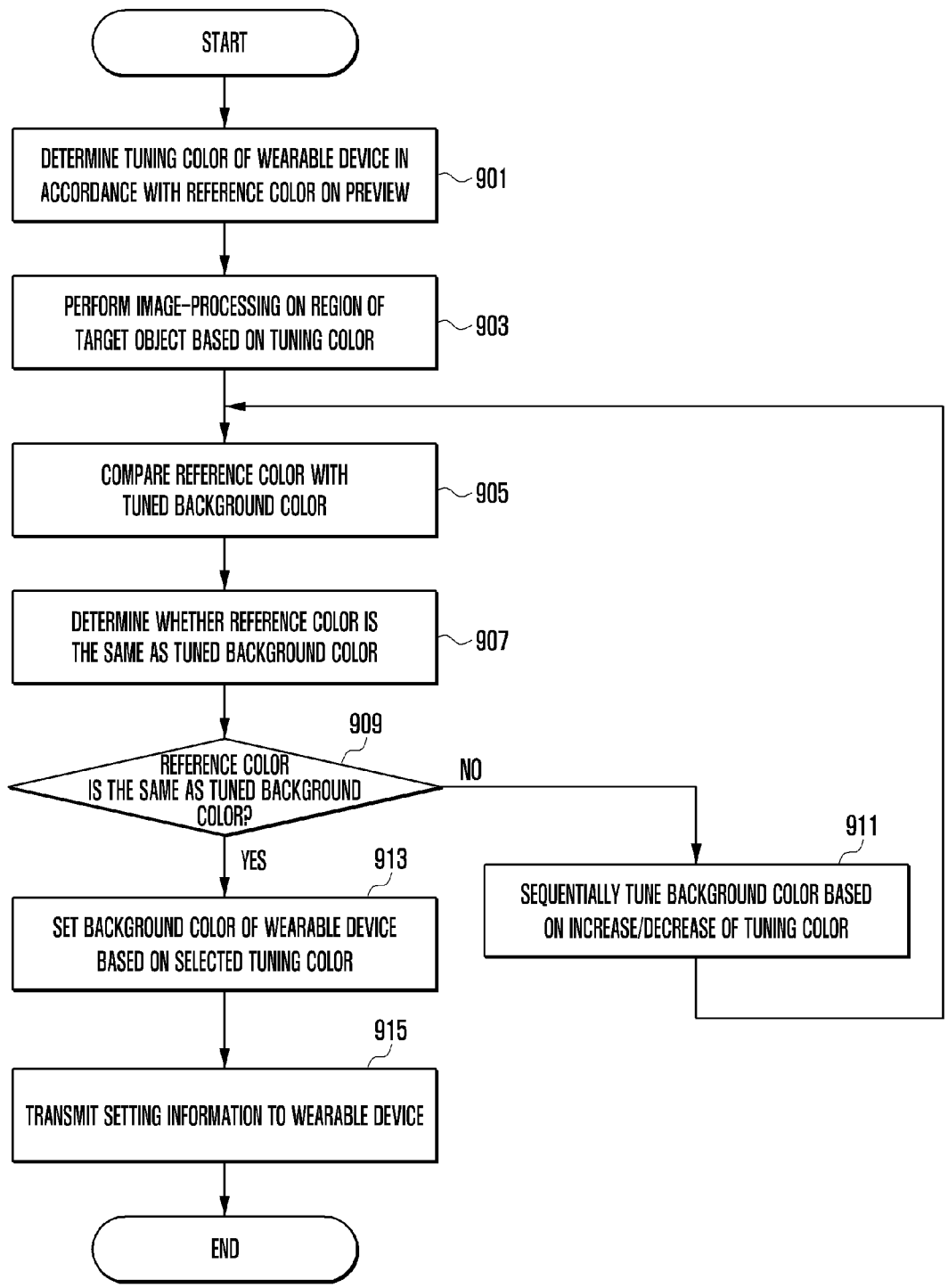
FIG. 9 is a flowchart illustrating an operation procedure of adjusting a background color by the electronic device, according to an embodiment of the present invention.

FIG. 9 is a flowchart illustrating an operation procedure of adjusting a background color by the electronic device, according to an embodiment of the present invention.

Referring to FIG. 9, when the electronic device 400 performs an adjustment operation for setting a background color of a wearable device, the electronic device 400 itself sets a background color of the wearable device by applying the adjusted background color based on AR.

In step 901, the control unit 480 determines a temporary background color (adjusted color) of a target object (for example, the wearable device) in accordance with a reference color of a reference object in a preview.

In step 903, the control unit 480 processes an image of a region, in which the target object is displayed on the preview, based on the adjusted color. According to an embodiment of the present invention, the control unit 480 may overlap a virtual object corresponding to the adjusted color onto a real world image (for example, the wearable device displayed on the preview) and display the virtual object. According to an embodiment of the present invention, the control unit 480 may identify the wearable device on the preview image through image recognition, and may trace a region corresponding to the display unit of the identified wearable device. The control unit 480 may overlap the virtual object on a region, in which the display unit of the wearable device is displayed, and display the virtual object by applying the adjusted color to the virtual object corresponding to a shape of the display unit of the wearable device. That is, the control unit 480 may provide a virtual background color of the wearable device through the virtual object by using AR technology.

The control unit 480 compares the reference color with the adjusted background color of the wearable device (for example, the adjusted color of the virtual object) based on the color comparison and analysis, in step 905. The control unit determines whether the reference color of the reference object is the same as the adjusted color (for example, the color displayed by the virtual object) of the target object, in step 907. According to an embodiment of the present invention, the electronic device 400 may store the detected reference color and background color, and compare the stored reference color and background color. The electronic device 400 may recognize and compare the reference color and the background color based on HSV or HSB, and may determine an adjusted color corresponding to the reference color through color recognition and comparison.

In step 909, the control unit 480 determines whether the reference color is the same as the adjusted color based on a result of the determination operation.

When it is determined that the reference color is different from the adjusted color ('NO' in step 909), the control unit 480 sequentially adjusts the temporary background color of the target object based on an increase or a decrease of an adjustment amount of the color of the target object, in step 911, and returns to step 905 to compare the reference color with the adjusted background color.

When it is determined that the reference color is the same as the adjusted color ('YES' in step 909), the control unit 480 sets the background color of the wearable device based on the currently selected adjusted color, in step 913, generates setting information (for example, a color value) based on the determined background color, and transmits the generated setting information to the wearable device, in step 915.

Figure 10:
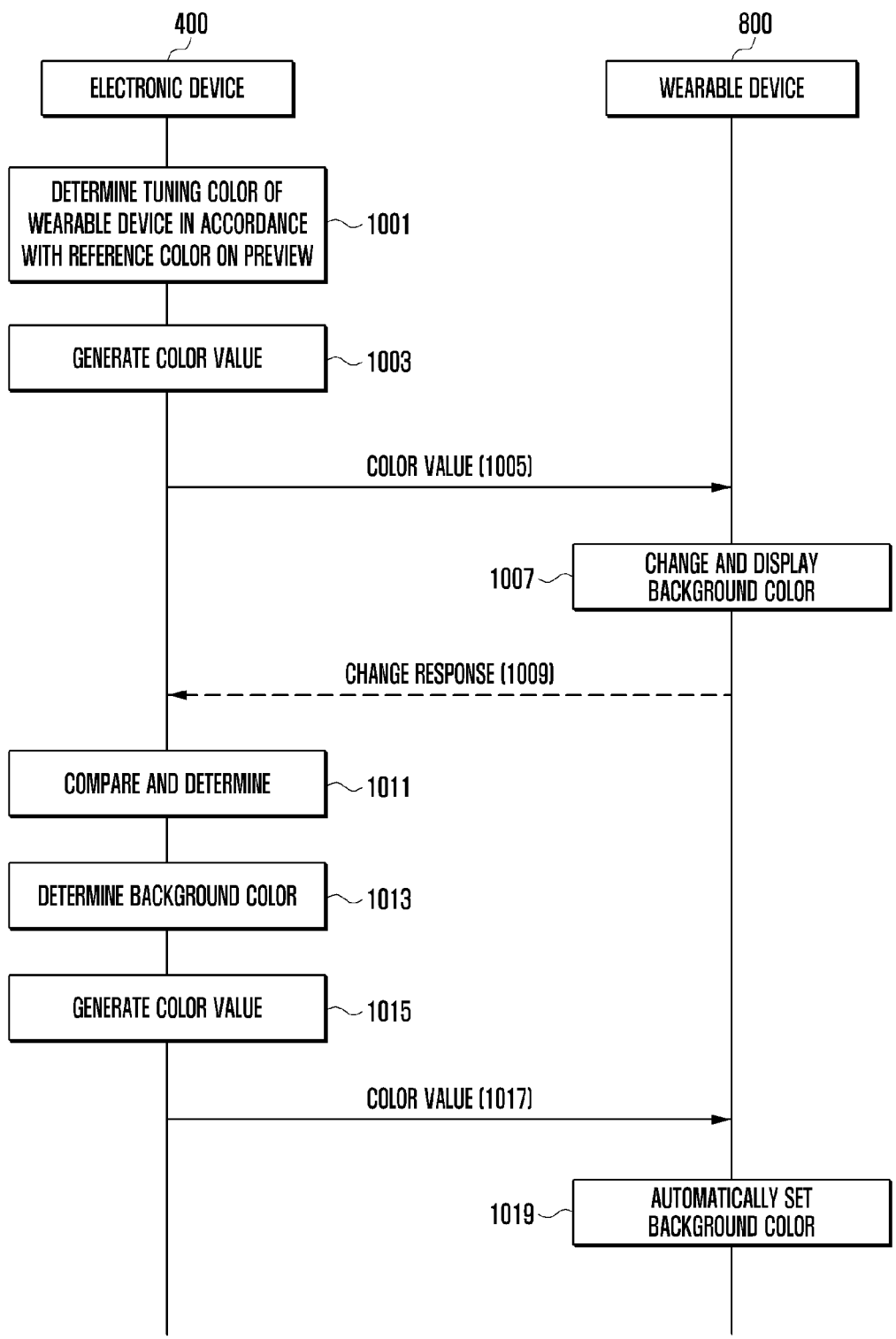
FIG. 10 is a diagram illustrating an operation procedure of adjusting a background color based on interconnection between a wearable device and the electronic device, according to an embodiment of the present invention.

FIG. 10 is a diagram illustrating an operation procedure of adjusting a background color based on interconnection between a wearable device and the electronic device, according to an embodiment of the present invention.

FIG. 10 illustrates an example of an operation, in which the electronic device 400 interconnects with the wearable device 800 in real time and sets a background color of the wearable device 800. For example, the electronic device 400 provides information related to an adjusted background color to the wearable device 800, the wearable device 800 temporarily changes and displays a background color according to the adjusted background color, the electronic device 400 recognizes the changed and displayed background color, and the electronic device 400 sets the background color of the wearable device 800 based on the reference color and the temporarily changed background color of the wearable device 800.

As illustrated in FIG. 10, in step 1001, the electronic device 400 determines an adjusted color of the wearable device 800 in accordance with a reference color on a preview. According to an embodiment of the present invention, the electronic device 400 may store the detected reference color and background color, and compare the stored reference color and background color. The electronic device 400 may calculate an average color based on the reference color, and determine an adjusted color corresponding to the reference color through the calculation of the color.

The electronic device 400 generates a color value corresponding to the determined adjusted color of the wearable device 800, in step 1003, and transmits the generated color value to the wearable device 800 through a predetermined manner of communication, in step 1005. According to an embodiment of the present invention, the electronic device 400 may calculate a color value corresponding to the adjusted color based on a pre-stored color code classification table.

In step 1007, when the wearable device 800 receives the color value from the electronic device 400, the wearable device 800 temporarily changes (sets) the background color of the wearable device 800 based on the color value, and displays the changed background color through a display unit thereof. According to an embodiment of the present invention, when the electronic device 400 transmits the color value during the adjusting operation, a command, in which the color value indicates the temporary background color, may also be transmitted. That is, the electronic device 400 may transmit the color value corresponding to the adjusted color and a control signal for temporarily setting the background color based on the color value.

In step 1009, the wearable device 800 transmits a change response signal to the electronic device 400 through a predetermined manner of communication. In an embodiment of the present invention, step 1009 may be omitted, and the electronic device 400 may recognize the change of the background color of the wearable device 800 and automatically perform operations described in detail below.

In step 1011, the electronic device 400 determines whether the reference color is the same as the adjusted color based on a comparison and an analysis of the colors, and repeatedly performs the adjusting operation when the reference color is not the same as the adjusted color.

In step 1013, when the electronic device 400 determines that the reference color is the same as the adjusted color based on the aforementioned operation, the electronic device 400 determines a background color to be set for the wearable device 800 based on the selected adjusted color.

The electronic device 400 generates a color value corresponding to the determined adjusted color of the wearable device 800, in step 1015, and transmits the generated color value to the wearable device 800 by a predetermined communication manner, in step 1017. According to an embodiment of the present invention, when the electronic device 400 transmits the color value corresponding to the determined background color, a command instructing to set the background color based on the color value may also be transmitted. That is, the electronic device 400 may transmit the color value corresponding to the background color and a control signal commanding to set the background color based on the color value.

In step 1019, when the wearable device 800 receives the color value from the electronic device 400, the wearable device 800 automatically changes (sets) the background color of the wearable device 800 based on the color value. Additionally or alternatively, the wearable device 800 may display the background color through the display unit based on the set background color when setting the background color, and further, when the wearable device 800 completes the setting of the background color, the wearable device 800 may transmit a response signal with respect to the completion of the setting of the background color to the electronic device 400.

Figure 11:
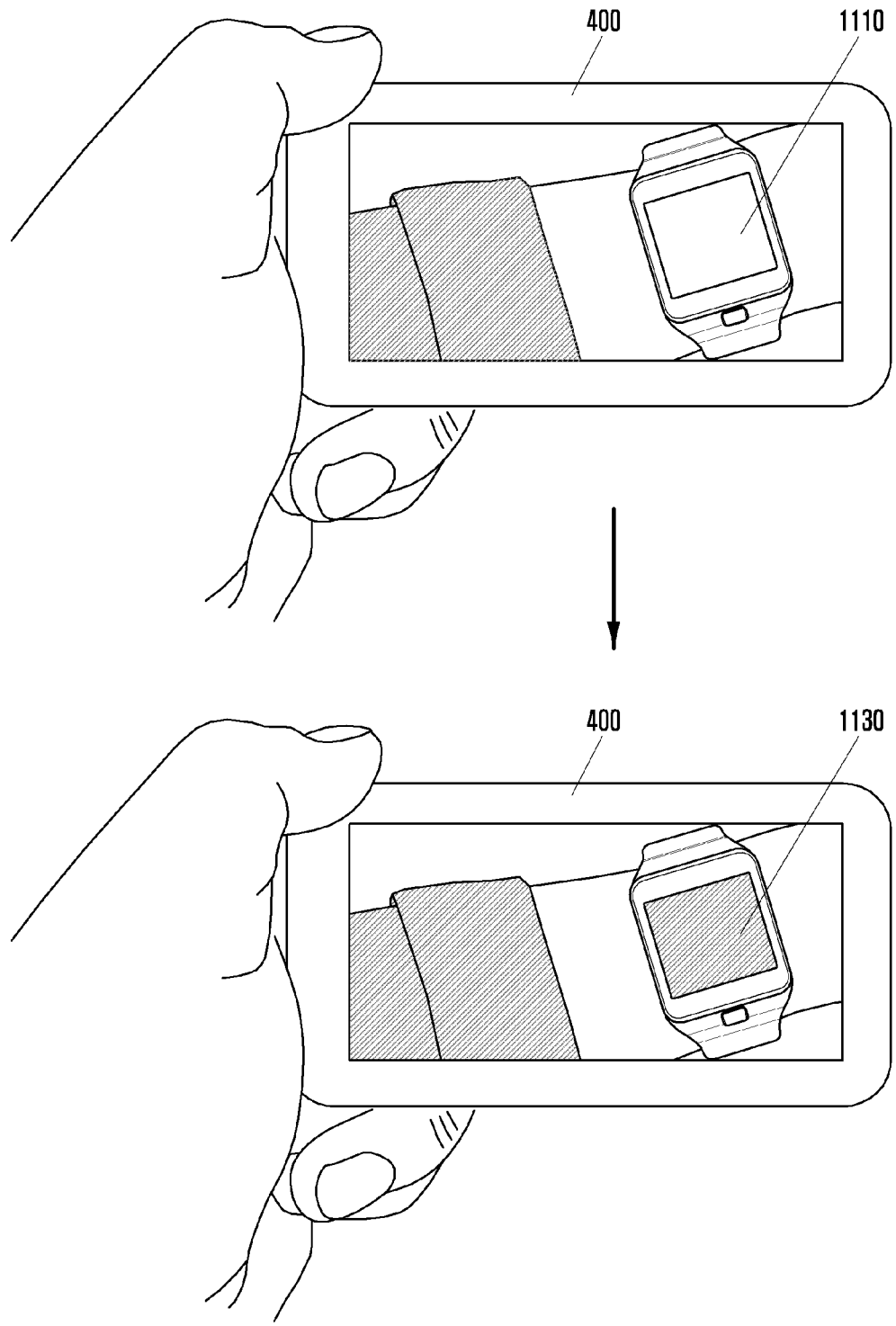
FIGS. 11, 12, and 13 are diagrams illustrating an operation of a trigger operation for differentiating an object by the electronic device, according to an embodiment of the present invention.

FIG. 11 is a diagram illustrating a trigger operation for differentiating an object by the electronic device, according to an embodiment of the present invention.

FIG. 11 illustrates an example of a trigger operation of automatically differentiating a reference object and a target object based on image tracing (for example, object recognition technology or image recognition technology).

As illustrated in FIG. 11, the electronic device 400 may execute a manager in response to a user input, and display an image of a subject (object) input through the camera module 470 on the display unit 431 as a preview in response to the execution of the manager. The electronic device 400 may differentiate images based on one or more recognizing technologies, and may identify a reference object (for example, clothes, skin, and a bag of a user) and a target object (for example, a wearable device) from the differentiated images.

According to an embodiment of the present invention, the electronic device 400 may differentiate the reference object and the target object, and may determine a state of the wearable device that is the target object. According to an embodiment of the present invention, the electronic device 400 may determine whether a display unit of the wearable device is in an off state 1110 or an on state 1130 by detecting a wavelength of light reflected by the wearable device. When the electronic device 400 determines that the wearable device is in the off state 1110, the electronic device 400 may wake up the wearable device. The wearable device may turn on the display unit in response to a control message of the electronic device 400.

Figure 12:
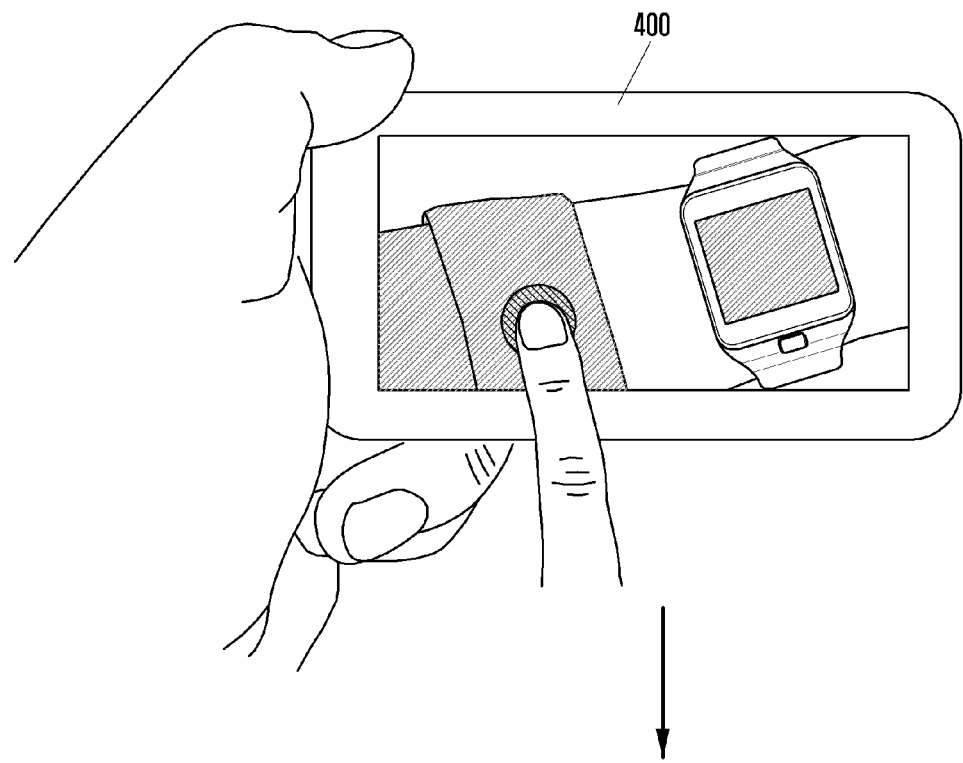
Figure 12:
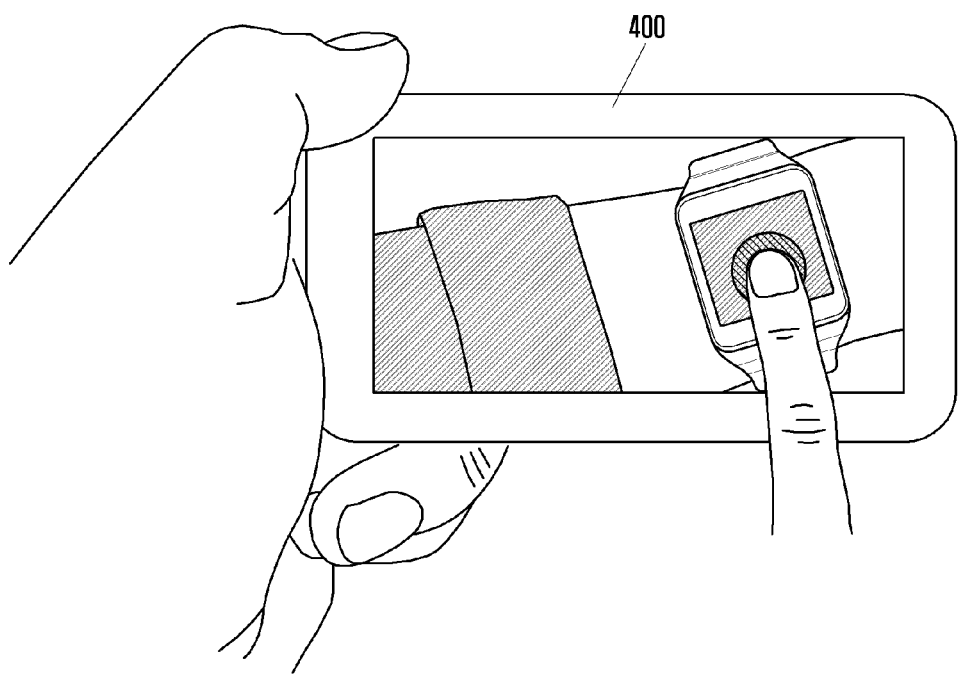

FIG. 12 is a diagram illustrating a trigger operation for discriminating an object by the electronic device, according to an embodiment of the present invention.

FIG. 12 illustrates an example of a trigger operation of differentiating a reference object and a target object based on a direct input (e.g., a touch input or a hovering input) of a user.

As illustrated in FIG. 12, the electronic device 400 may execute a manger in response to a user input, display an image of a subject (object) input through the camera module 470 on the display unit 431 as a preview in response to the execution of the manager, and wait for a user input for selecting a reference object and a target object. The user may select the reference object by selecting (for example, via a touch input or a hovering input, hereinafter, a first input) a first region (for example, a region in which clothes of the user are displayed) of an image to be designated as the reference object from the image displayed as the preview, and subsequently, select the target object by selecting (for example, via a touch input or a hovering input, hereinafter, a second input) a second region (for example, a region in which the wearable device is displayed) of an image to be designated as the target object from the image displayed as the preview.

According to an embodiment of the present invention, when the electronic device 400 detects the first input, the electronic device 400 may determine the region of the image, in which the first input is detected, as the reference object, and when the electronic device 400 detects the second input (e.g. a later input), the electronic device 400 may determine the region of the image, in which the second input is detected, as the target object. As described above, the electronic device 400 may detect the user input through the touch detecting unit 433 in a state in which the subject (object) is displayed as a preview through the display unit 431, and may differentiate an object in response to the user input.

Figure 13:
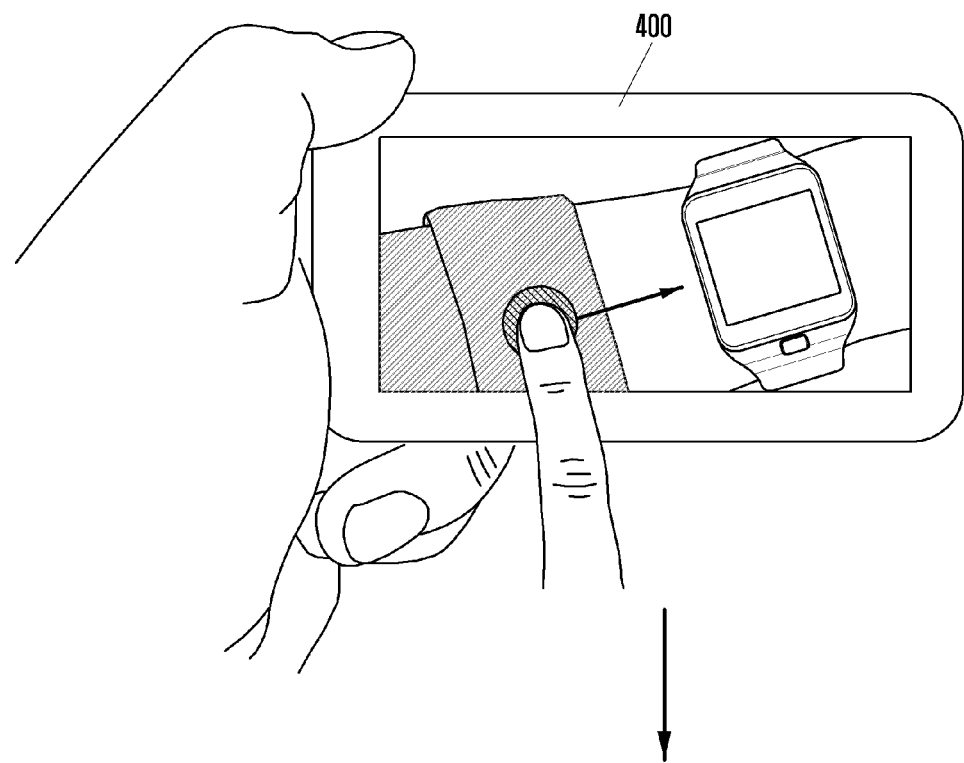
Figure 13:
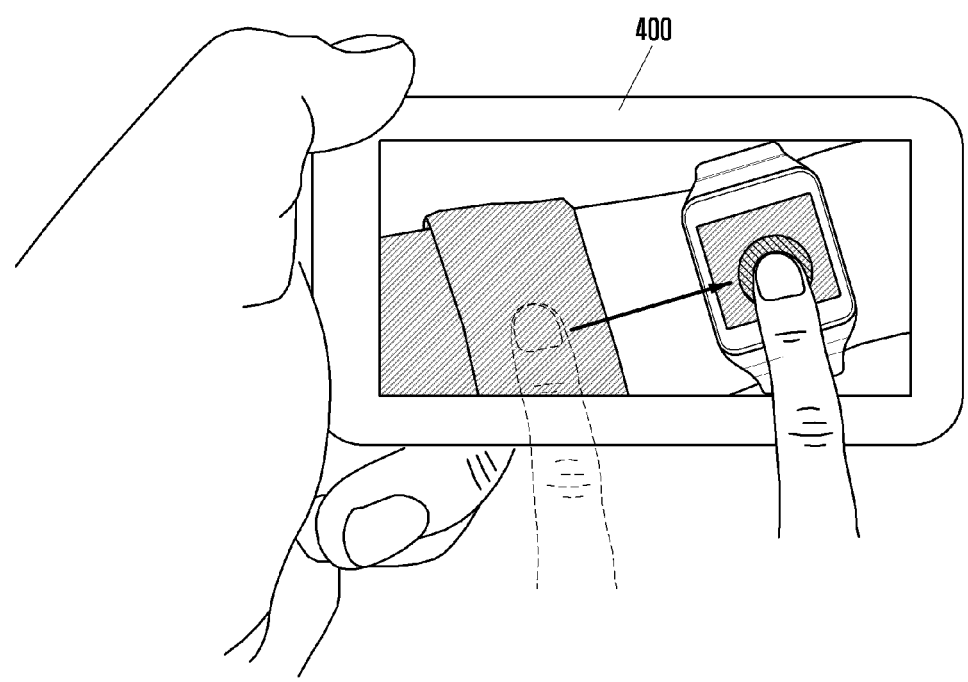

FIG. 13 is a diagram illustrating a trigger operation for differentiating an object by the electronic device, according to an embodiment of the present invention.

FIG. 13 illustrates an example of a trigger operation of differentiating a reference object and a target object based on a direct gesture input of a user.

As illustrated in FIG. 13, the electronic device 400 may execute a manger in response to a user input, display an image of a subject (object) input through the camera module 470 on the display unit 431 as a preview in response to the execution of the manager, and wait for a user input selecting a reference object and a target object. The user may select a reference object by selecting (for example, via a touch input or a hovering input) a first region (for example, a region, in which clothes of the user are displayed) of an image to be designated as the reference object. The user may select a target object by moving, or moving and then releasing, (for example, a touch gesture or a hovering gesture corresponding to flick, sweep, or a drag and drop, hereinafter, a second gesture input) the first input to a second region (for example, a region, in which the wearable device is displayed) of the image to be designated as the target object while maintaining the first input.

According to an embodiment of the present invention, when the electronic device 400 detects the first input while waiting for a user input in the preview state, the electronic device 400 may determine the region of the image, in which the first input is detected, as the reference object. When the electronic device 400 detects the second input (e.g., a later input) by moving the first gesture input, the electronic device 400 may determine the region of the image, in which the second input is detected, as the target object. As described above, the electronic device 400 may detect the user input through the touch detecting unit 433 in a state where the subject (object) is displayed as a preview through the display unit 431, and differentiate an object in response to the user input.

Figure 14:
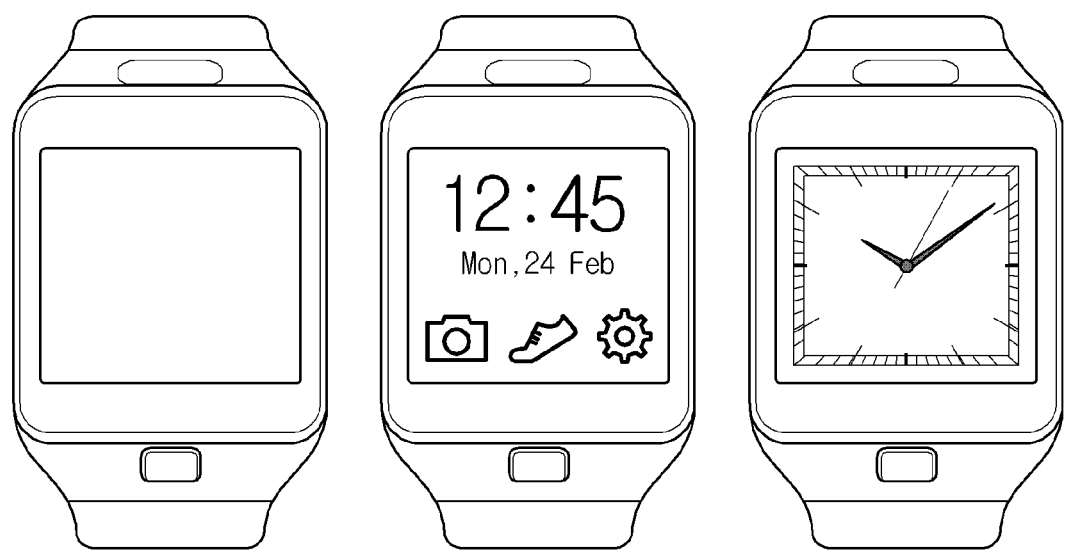
FIG. 14 is a diagram illustrating an operation of setting a background color by a wearable device, according to an embodiment of the present invention.

FIG. 14 is a diagram illustrating an example of an operation of setting a background color by a wearable device, according to an embodiment of the present invention.

As illustrated in FIG. 14, the setting of the background color of the wearable device performed under the control of the electronic device 400 may include changing and setting the background color while maintaining a graphical element of a function by interconnecting with the graphical element (for example, a UI) according to performance of a function (for example, a stand-by mode operation or a clock function operation) of the wearable device, as well as changing and setting only the background color.

Figure 15:
FIG. 15 is a diagram illustrating a color correction supported by the electronic device, according to an embodiment of the present invention.

FIG. 15 is a diagram illustrating an example of a color correction supported by the electronic device, according to an embodiment of the present invention.

According to an embodiment of the present invention, the background color set in the wearable device under the control of the electronic device 400 may be set with multi-colors, as well as a single color. For example, the clothes, the bag, or the accessory of the user, which is the reference object, may be formed of a single color or multi-colors. When the reference object is formed of a single color or multi-colors, the electronic device 400 may set various graphics (hereinafter, a background, for example, a background color, a theme, a style, and skin) of the wearable device with multi-colors based on at least some of the multi-colors, as illustrated in FIG. 15.

Referring to FIG. 15, the electronic device 400 may generate a color value based on at least some of the multi-colors, and transmit a control signal for setting the background color with multi-colors to the wearable device based on the color value. When the wearable device receives a control signal for setting a background color with a color value corresponding to multi-colors from the electronic device 400, the wearable device may set a background based on the multi-colors based on the received color value as illustrated in FIG. 15. In an embodiment of the present invention, only the background region may be changed based on the multi-colors, or the graphical element of the function and the background may be changed based on the multi-colors.

Figure 16:
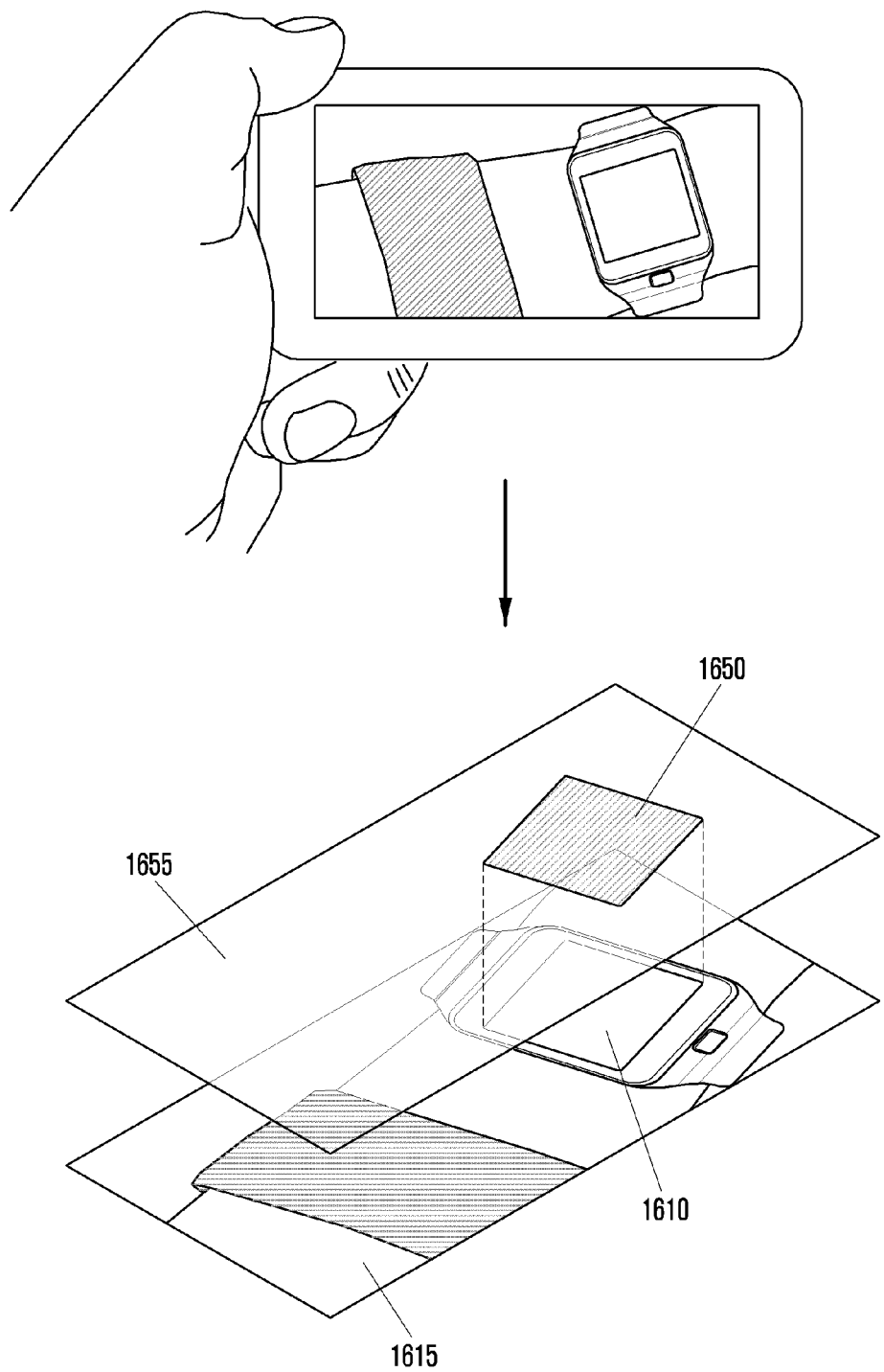
FIG. 16 is a diagram illustrating an operation of providing a virtual object based on augmented reality by the electronic device, according to an embodiment of the present invention.

FIG. 16 is a diagram illustrating an operation of providing a virtual object based on AR by the electronic device, according to an embodiment of the present invention.

Referring to FIG. 16, the electronic device 400 may extract a target object based on image tracing, and extract a region 1610 corresponding to a display unit of a wearable device from the target object. When the electronic device 400 extracts the region 1610, the electronic device 400 may generate a virtual object 1650 having a form corresponding to the extracted region 1610.

The electronic device 400 may overlap and display the target object in the real world and the virtual object 1650 by displaying a layer 1655 for the virtual object 1650 over a layer 1615, on which an image obtained through the camera module 470 is displayed as a preview. In an embodiment of the present invention, an adjusted color determined according to an adjusting operation of the electronic device 400 may be applied to the virtual object, and the virtual object may be displayed.

According to an embodiment of the present invention, in the color correction for the reference object and the target object, various surrounding environments may be considered. For example, a color of an object may be shown differently according to a light source. Accordingly, the electronic device 400 may determine an environment element, such as an indoor or outdoor, natural light, artificial light, or luminance, and may also perform a color correction by applying an average value or a weighted value based on the determined environment element.

Further, according to an embodiment of the present invention, when the electronic device 400 sets a background color of the wearable device, the electronic device 400 may also set a background color of the electronic device 400 to correspond to the background color. The electronic device 400 may change a background color of the electronic device 400 while transmitting a control signal for setting a background color of the wearable device.

Further, according to an embodiment of the present invention, in at least some operations (for example, the adjusting operation) in the color correction operation, various outputs corresponding to a recognized color may be processed. The electronic device 400 may display color information (for example, a color code and a color name) corresponding to a recognized color on a corresponding object.

Further, according to an embodiment of the present invention, the electronic device 400 may output color information corresponding to a recognized color through the speaker 441 based on an audio signal by using a text-to-voice converting function (for example, a Text To Speech (TTS) function). Further, the electronic device 400 may store a color code classification table including code classification and color information based on multi-colors, and support color information output based on the color code classification table.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method of operating an electronic device, comprising:
    displaying, by a display unit of the electronic device, an image as a preview;
    differentiating, by a control unit of the electronic device, a reference object and a wearable device in the image;
    determining, by the control unit, a reference color of the reference object and a background color displayed by the wearable device;
    adjusting, by the control unit, the background color of the wearable device so as to correspond to the reference color of the reference object; and
    setting, by the control unit, the background color of the wearable device.

2. The method of claim 1, wherein the reference object comprises a first image corresponding to at least one of clothes, skin, a bag, and an accessory.

3. The method of claim 1, wherein differentiating the reference object and the wearable device is performed based on image tracing or a user input.

4. The method of claim 1, wherein determining the reference color and the background color comprises:
    capturing a first image corresponding to the reference object and a second image corresponding to the wearable device as a background in a preview state; and
    analyzing the first image and second image, and extracting the reference color and the background color from the reference object and the wearable device.

5. The method of claim 4, wherein adjusting the background color comprises changing the background color of the wearable device so as to correspond to the reference color of the reference object and displaying the background color of the wearable device.

6. The method of claim 4, wherein adjusting the background color comprises:
    comparing the reference color of the reference object with the background color of the wearable device; and
    when the reference color is not the same as the background color, adjusting the background color and displaying the background color.

7. The method of claim 5, wherein changing and displaying the background color of the wearable device comprises overlapping a virtual object corresponding to the changed background color on the wearable device using Augmented Reality (AR) and displaying the virtual object on the wearable device.

8. The method of claim 5, wherein changing and displaying the background color of the wearable device comprises temporarily setting and displaying the background color of the wearable device, based on a color value corresponding to the changed background color.

9. The method of claim 8, wherein changing and displaying the background color of the wearable device further comprises:
    displaying the temporarily set background color through a display unit by the wearable device; and
    displaying the background color of the wearable device input through a camera module as the preview by the electronic device.

10. The method of claim 1, wherein displaying of the image as the preview comprises executing a manager for setting a background color of the wearable device.

11. The method of claim 10, wherein executing the manager comprises waking up the wearable device in response to execution of the manager.

12. The method of claim 11, wherein executing the manager further comprises:
    determining a state of the wearable device; and
    when a display unit of the wearable device is in an off state, transmitting a wake-up signal to the wearable device.

13. The method of claim 12, wherein the wearable device turns on the display unit in response to the wake-up signal, and displays the background color.

14. The method of claim 10, wherein executing the manager comprises controlling a camera module to be turned on in response to execution of the manager.

15. The method of claim 1, wherein the reference color comprises a single color or multi-colors.

16. The method of claim 1, wherein:
    setting the background color comprises setting various graphics of the wearable device, and
    the various graphics include a background color, a theme, a style, and a skin.

17. An electronic device, comprising:
    a communication unit configured to perform communication with a wearable device using a predetermined manner of communication;

a camera module configured to photograph a reference object and the wearable device;

a display unit configured to display an image input through the camera module; and a control unit configured to control the display unit to display the image as a preview, differentiate the reference object and the wearable device in the image, and set a background color displayed on the wearable device to correspond to a reference color of the reference object.

18. The electronic device of claim 17, further comprising:

a storage unit configured to store a color code and an adjusted color value.

19. The electronic device of claim 17, wherein the reference object comprises a first image corresponding to clothes, skin, a bag, and an accessory.

20. A non-transitory computer readable recording medium with computer executable instructions stored thereon executed by a processor to perform a method of operating an electronic device, the method comprising:

displaying an image as a preview;

differentiating a reference object and a wearable device in the image;

determining a reference color of the reference object and a background color displayed on the wearable device;

adjusting the background color of the wearable device so as to correspond to the reference color of the reference object; and setting the background color of the wearable device.

\* \* \* \* \*